United States Patent [19]

Lederer et al.

[11] Patent Number: 5,325,361
[45] Date of Patent: Jun. 28, 1994

[54] SYSTEM AND METHOD FOR MULTIPLEXING DATA TRANSMISSIONS

[75] Inventors: Jeffrey H. Lederer, Pittsburgh; David J. Connell, Coraopolis; Patrick V. Pagano, Pittsburgh, all of Pa.

[73] Assignee: Legent Corporation, Pittsburgh, Pa.

[21] Appl. No.: 983,694

[22] Filed: Dec. 1, 1992

[51] Int. Cl.$^5$ ............................................. H04J 3/00
[52] U.S. Cl. ........................................ 370/94.1; 370/99; 395/153; 395/157
[58] Field of Search .................. 370/85.1, 99, 94.1, 370/43, 79, 112, 77, 62, 110.1, 58.1; 364/200, 284; 395/100, 112, 114, 115, 118, 153, 157, 162, 200

[56] References Cited

U.S. PATENT DOCUMENTS

| | | | |
|---|---|---|---|
| 4,736,369 | 4/1988 | Barzilai et al. | 370/79 |
| 4,750,171 | 6/1988 | Kedar et al. | 370/85.1 |
| 4,768,190 | 8/1988 | Giancarlo | 370/85.15 |
| 4,941,089 | 7/1990 | Fischer | 370/94.1 |
| 4,953,159 | 8/1990 | Hayden et al. | 370/85.1 |
| 5,010,549 | 4/1991 | Katon et al. | 370/94.1 |

OTHER PUBLICATIONS

William Stallings, "Data and Computer Communications", 1988, pp. 479-581, 2nd Edition, published by MacMillan Publishing Company.

Primary Examiner—Douglas W. Olms
Assistant Examiner—Huy D. Vu
Attorney, Agent, or Firm—Kirkpatrick & Lockhart

[57] ABSTRACT

The present invention is directed to a system for multiplexing data transmissions exchanged between a host computer system and a user workstation connected by a communications link. One or more host application programs reside upon and are executed by the host computer system while a terminal emulation program having the capability of simultaneously displaying one or more host application program screens resides upon and is executed by the user workstation. The data transmission multiplexing system comprises a session manager program residing upon and executed by the host computer system for establishing one or more program sessions with the host application programs, each of the program sessions generating its own individual datastreams, and a single program session with the terminal emulation program utilizing a single connection between the host computer system and the user workstation. The terminal emulation program simultaneously displays the host application program screen for each of the program sessions established between the session manager program and the host application programs. The multiplexing system includes a multiplexing program for performing the following functions: (1) building inner data packets from the individual datastreams generated by each program session; (2) inserting the inner data packets into one or more data transmission packets for transmission between the host computer system and the user workstation over the single logical connection; and (3) removing the inner data packets from the one or more data transmission packets for recreating the individual datastreams therefrom.

10 Claims, 16 Drawing Sheets

OPEN WINDOW INNER DATA PACKET

CLOSE WINDOW INNER DATA PACKET

3270 DATASTREAM INNER DATA PACKET

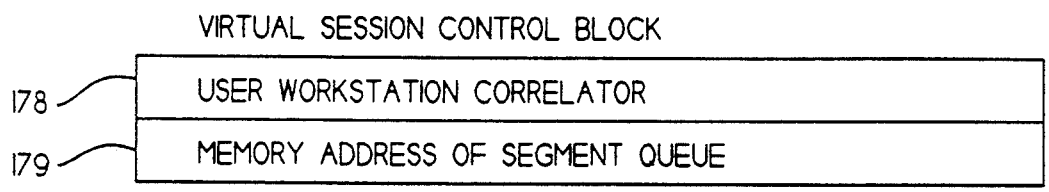
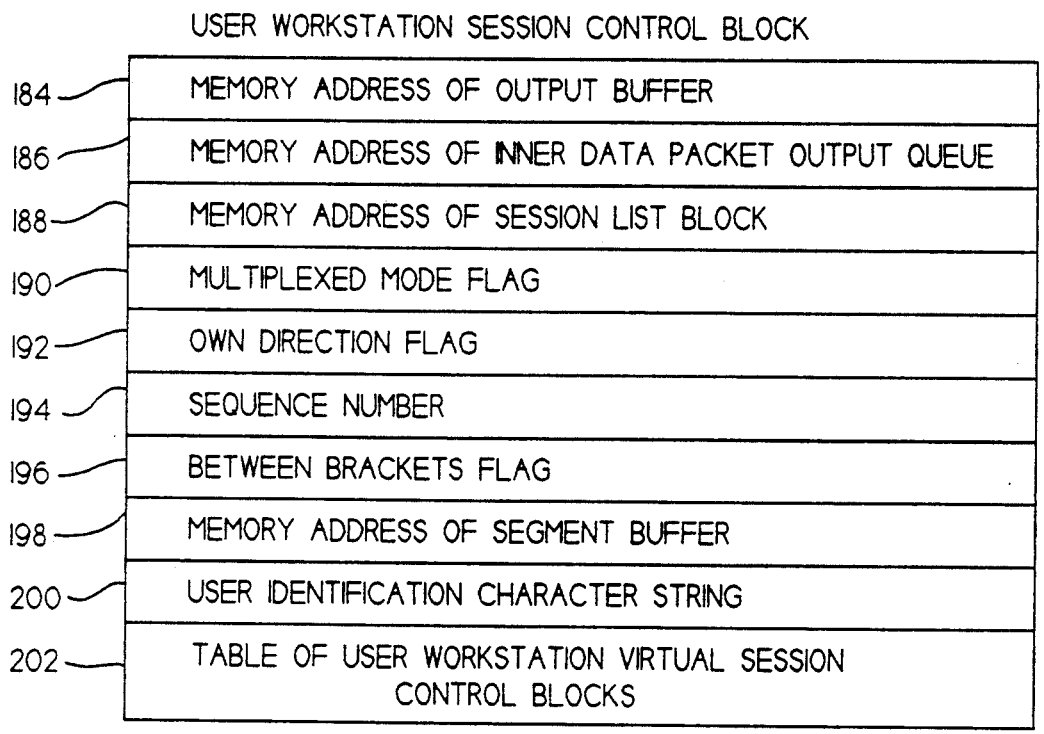
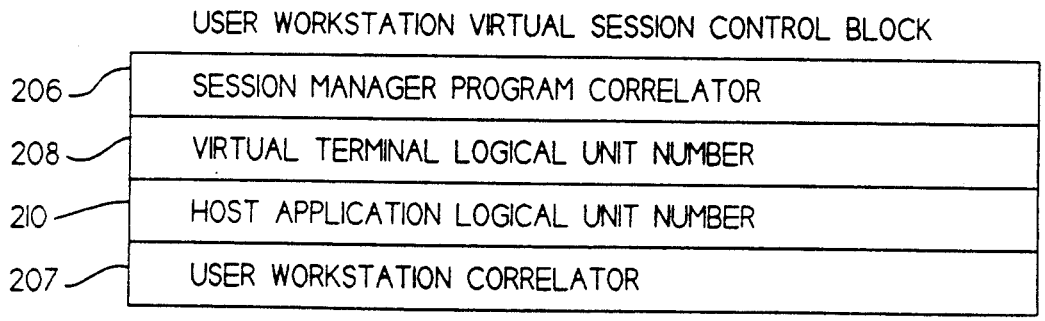

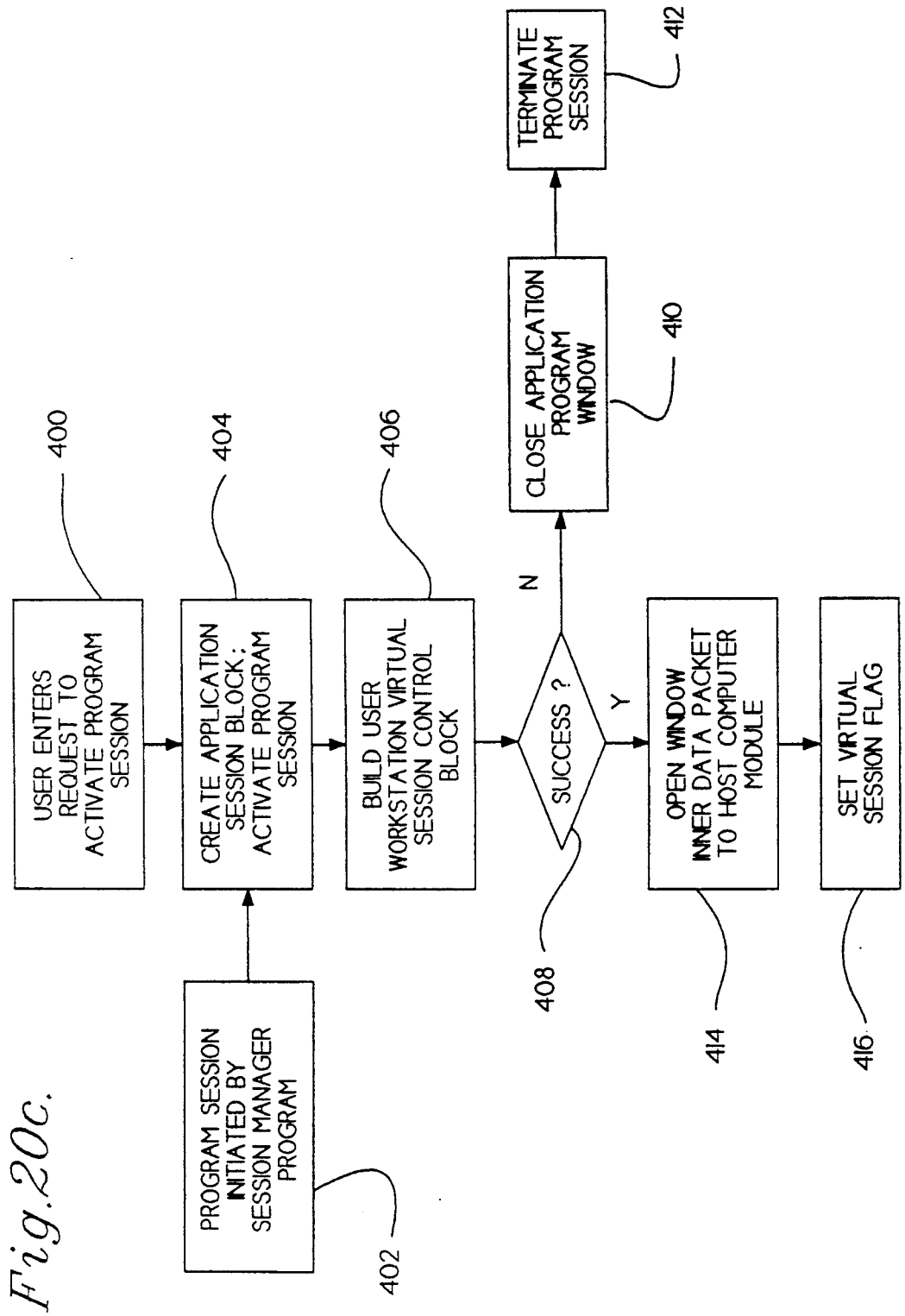

SYSTEM AND METHOD FOR MULTIPLEXING DATA TRANSMISSIONS

BACKGROUND OF THE INVENTION

1. Field of the Invention

The present invention is directed generally to a system and method for multiplexing data transmissions and, more specifically, to a system and method for multiplexing data transmissions exchanged between a timesharing computer system and a user workstation.

2. Description of the Background of the Invention

A timesharing computer system may be accessed by a user through a video display terminal connected to the timesharing computer by means of a data communications system. The user may gain access to the timesharing computer system by establishing a program session with an application program executing on the timesharing computer. The user can interact with the application program by utilizing a keyboard attached to the video display terminal and see the results of the application on the video display terminal's screen.

Advanced video display terminals, such as distributed function terminals ("DFTs"), enable a user to initiate multiple program sessions with a timesharing computer system by establishing multiple connections between the DFT and the timesharing computer. One connection is established for each program session. The DFT utilizes windowing software to allow the user to view the multiple programs sessions simultaneously. A selection methodology permits a user to direct the keyboard input to any particular program session.

A significant drawback to the technique utilized in DFTs is that one connection must be dedicated to each program session. The number of connections on each communications pathway to the timesharing computer is usually limited and must be shared by all DFTs utilizing that communications pathway.

A type of application program called a "session manager", designed to execute on a timesharing computer system, has the capability of establishing and maintaining multiple program sessions simultaneously for a user utilizing a single video display terminal. The video display terminal maintains a single connection with the timesharing computer and establishes a single program session with the session manager program. The session manager program, in turn, maintains multiple program sessions with application programs executing on the timesharing computer system. The user can view and interact with only one program session at any given time. Using a keyboard sequence, generally known as a "hot key" sequence, the user can select from among the program sessions for viewing and keyboard input.

The disadvantage to session manager programs is that only a single application program can be viewed and interacted with at any one time. Thus, the need exists for a system which allows a user to view multiple application program sessions simultaneously, permits the user to direct keyboard input to any one of these multiple program sessions and, at the same time, establishes only a single connection with the timesharing computer system.

SUMMARY OF THE INVENTION

The present invention is directed to a system for multiplexing data transmissions exchanged between a host computer system and a user workstation wherein the host computer system and the user workstation are connected by a communications link and wherein one or more host application programs reside upon and are executed by the host computer system. A terminal emulation program having the capability of simultaneously displaying one or more host application program screens resides upon and is executed by the user workstation.

The multiplexing system comprises a session manager program residing upon and executed by the host computer system for establishing one or more program sessions with the host application programs, each of the program sessions generating its own individual datastreams, and for establishing a single program session with the terminal emulation program utilizing a single connection between the host computer system and the user workstation. The terminal emulation program simultaneously displays the host application program screen for each of the program sessions established between the session manager program and the host application programs. The system further comprises means residing in the host computer system and in the user workstation for intercepting the individual datastreams before the individual datastreams are transmitted by either the host computer system to the user workstation or by the user workstation to the host computer system, means residing in the host computer system and in the user workstation for building inner data packets from the individual datastreams generated by each of the program sessions, and means residing in the host computer system and in the user workstation for inserting the inner data packets into one or more data transmission packets for transmission between the host computer system and the user workstation over the single connection. Means residing in the host computer system and in the user workstation intercept the data transmission packets received by the host computer system and the user workstation before the data transmission packets are processed by either the session manager program or the terminal emulation program, respectively. Finally, means residing in the host computer system and in the user workstation to remove the inner data packets from the one or more data transmission packets to recreate the individual datastreams therefrom.

The present invention is further directed to a method for multiplexing data transmissions exchanged between a host computer system and a user workstation wherein the host computer system and the user workstation are connected by a communications link and wherein one or more host application programs reside upon and are executed by the host computer system. A terminal emulation program having the capability of simultaneously displaying one or more host application program screens resides upon and is executed by the user workstation. The data transmissions multiplexing method includes the following steps (1) establishing one or more program sessions with the host application programs, each of the program sessions generating its own individual datastreams; (2) establishing a single program session with the terminal emulation program utilizing a single connection between the host computer system and the user workstation, wherein the terminal emulation program simultaneously displays the host application program screen for each of the program sessions established with the host application programs; (3) intercepting the individual datastreams before the individual datastreams are transmitted from the host computer system to the user workstation or by the user workstation to the host computer system; (4) building inner data packets from the individual datastreams generated by each of the program sessions; (5) inserting the inner data packets into one or more data transmission packets for transmission between the host computer system and the user workstation over the single connection; (6) intercepting the data transmission packets received by the host computer system and the user workstation before the data transmission packets are processed by either the host application programs or the terminal emulation program, respectively; and (7) removing the inner data packets from the one or more data transmission packets and for recreating the individual datastreams therefrom.

The system and method of the present invention for multiplexing data transmissions exchanged between a host computer system and a user workstation provide the means for allowing a user to view multiple application program sessions simultaneously and to direct keyboard input to any one of these multiple program sessions while using only a single connection between the timesharing computer system and the user workstation. These and other advantages and benefits of the present invention will become apparent from the description of a preferred embodiment hereinbelow.

BRIEF DESCRIPTION OF THE DRAWINGS

For the present invention to be clearly understood and readily practiced, a preferred embodiment will now be described, by way of example only, with reference to the accompanying figures wherein:

FIG. 17 illustrates a Virtual Session Control Block utilized in conjunction with the multiplexing program of the present invention;

FIG. 18 illustrates a User Workstation Session Control Block utilized in conjunction with the multiplexing program of the present invention;

FIG. 19 illustrates a User Workstation Virtual Session Control Block utilized in conjunction with the multiplexing program of the present invention; and FIGS. 20a–20i illustrate flow charts explaining the operation of the multiplexing program of the present invention.

DESCRIPTION OF THE PREFERRED EMBODIMENT

Figure 1:
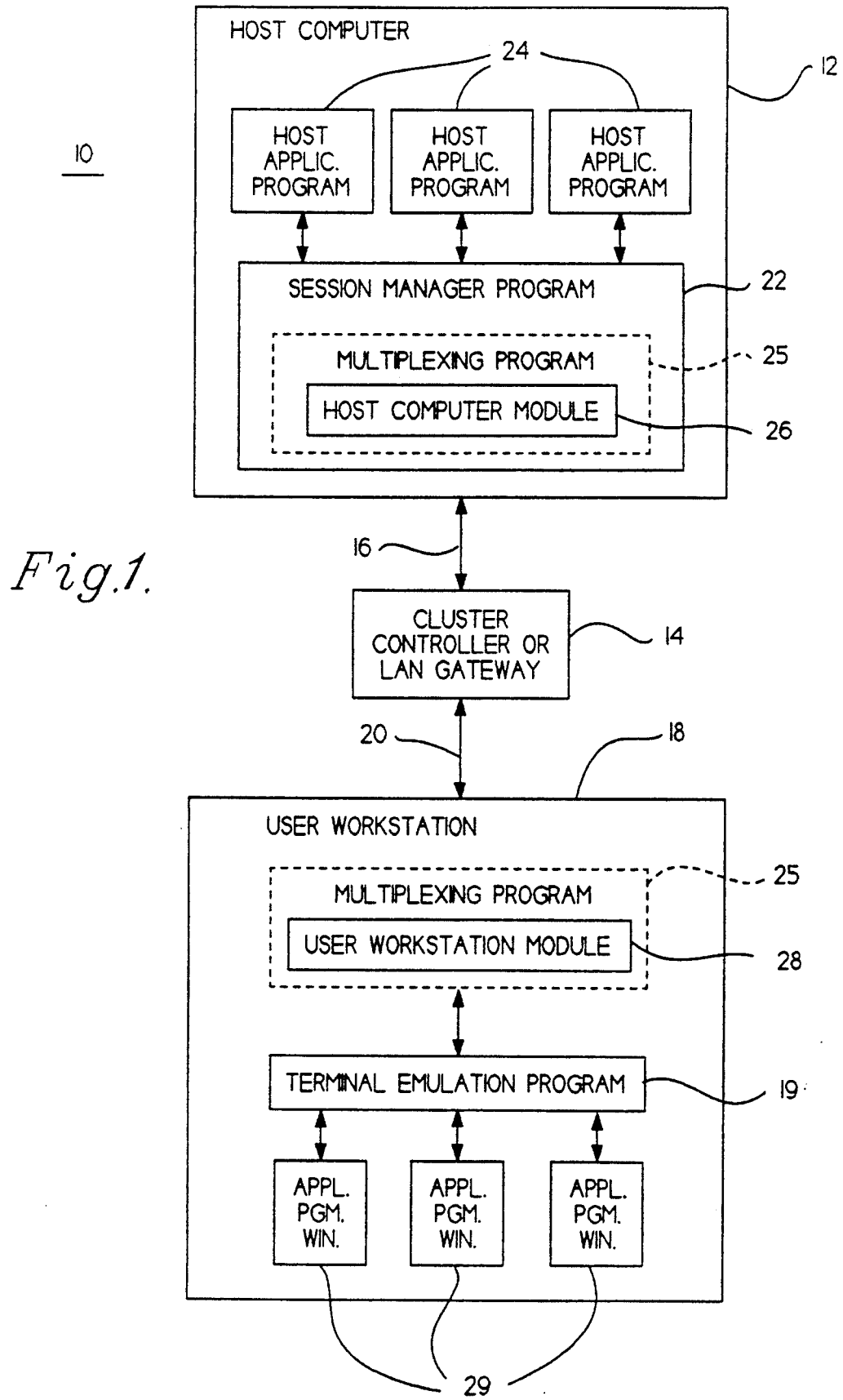
FIG. 1 illustrates a simplified representation of a timesharing computer system and a user workstation in which the system and method of the present invention may be employed.

FIG. 1 illustrates a simplified representation of a typical timesharing computer system 10 in which the system and method of the present invention for multiplexing data transmissions exchanged between a timesharing computer system and a user workstation may be employed. A host computer 12 is connected to the cluster controller or local area network gateway 14 by means of communications link 16. A user workstation 18 is connected to a cluster controller or local area network gateway 14 by means of coaxial cable 20. One of ordinary skill in the art will recognize that multiple cluster controllers or local area network gateways 14 may be connected to host computer 12 and that multiple user workstations 18 may by connected to each cluster controller or local area network gateway 14. One of ordinary skill in the art will also recognize that the user workstation 18 may be comprised of a personal computer (not shown) which includes an attached video display screen (not shown) and keyboard (not shown). The user workstation 18 includes a terminal emulation program 19 which causes the user workstation 18 to function as an ordinary video display terminal when communicating with the host computer 12. Terminal emulation program 19 includes means for "displaying" application program windows 29 on the video display screen (not shown) and means for directing input from the keyboard (not shown) to any particular application program window 29.

A session manager program 22 resides within and is executed by host computer 12. The session manager program 22 is capable of establishing program sessions with multiple host application programs 24 also residing within and executed by host computer 12. The terminal emulation program 19 establishes a single program session with session manager program 22 utilizing a single connection between host computer 12 and user workstation 18. The design and implementation of session manager program 22, the method for establishing a program session between session manager program 22 and terminal emulation program 19, and the method for establishing a single connection between host computer 12 and user workstation 18 are well known to those of ordinary skill in the art.

A multiplexing program 25 embodying the system and method of the present invention is comprised of a host computer module 26 and a user workstation module 28. The host computer module 26 is a part of the session manager program 22 and, thus, resides on and is executed by host computer 12 while the user workstation module 28 resides on and is executed by user workstation 18. The multiplexing program 25 operates in conjunction with the session manager program 22 and terminal emulation program 19 to provide the functionality for allowing a user to establish and view multiple program sessions (through application program windows 29) simultaneously at user workstation 18 and to directs keyboard input to any one of these multiple program sessions (through application program windows 29). This is accomplished utilizing a single connection between host computer 12 and user workstation 18. There is no limit to the number of program sessions that can be established and viewed at any one time.

The multiplexing program 25 includes a communications protocol that allows data and flow control information for a program session to be combined into a single data packet and for multiple data packets, possibly from multiple program sessions, to be combined into a single data transmission packet. In addition, the communications protocol allows the data packets to be segmented and to span multiple data transmission packets. The multiplexing program 25 does not require the alteration of any physical devices, the host computer operating system software (not shown), the host application programs 24 or the communications link 16. The operation of both the host computer module 26 and the user workstation module 28 will be explained more fully hereinbelow through the use of the flows charts illustrated in FIGS. 20a through 20i.

IBM SNA Protocol Stack

Figure 2:
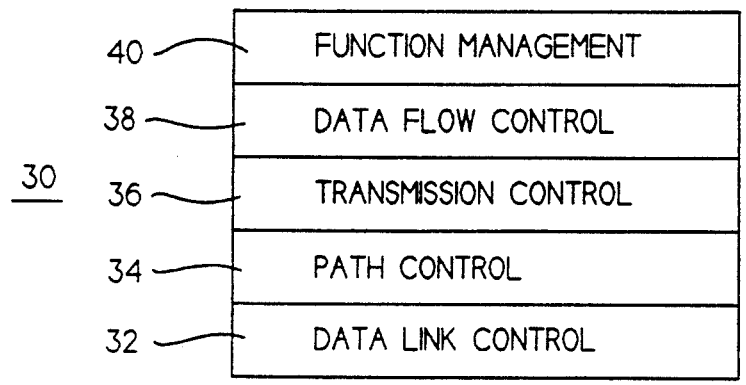
FIG. 2 illustrates an IBM ® *Systems Network Architecture* ® *Protocol Stack;*

While the system and method of the present invention can be implemented in any timesharing computer system environment, the preferred embodiment described herein will be described in relation to the IBM Systems Network Architecture "SNA" environment. Communications between host computer 12 and user workstation 18 in an SNA environment are controlled according to a defined protocol. This protocol consists of five layers of control routines which, when considered together, are denominated as the SNA Protocol Stack. The SNA Protocol Stack 30 is illustrated in FIG. 2. Those of ordinary skill in the art will readily recognize that the SNA Protocol Stack is comprised of five layers of protocol routines: (1) Data Link Control ("DLC") 32; (2) Path Control ("PC") 34; (3) Transmission Control ("TC") 36; (4) Data Flow Control ("DFC") 38; and (5) Function Management ("FM") 40. Further, the function of each of these layers of protocol is well known to those of ordinary skill in the art.

Figure 3:
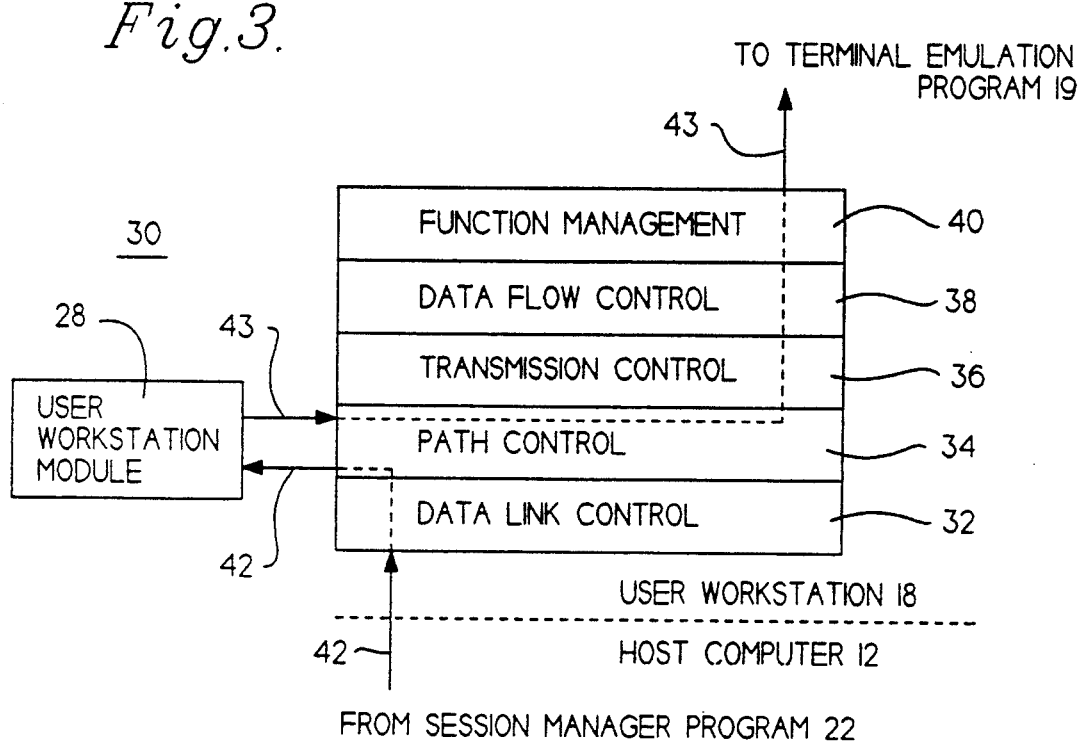
FIG. 3 illustrates the interface between a user workstation module of the present invention performing demultiplexing processing and the *IBM Systems Network Architecture Protocol Stack* of the terminal emulation program.
Figure 4:
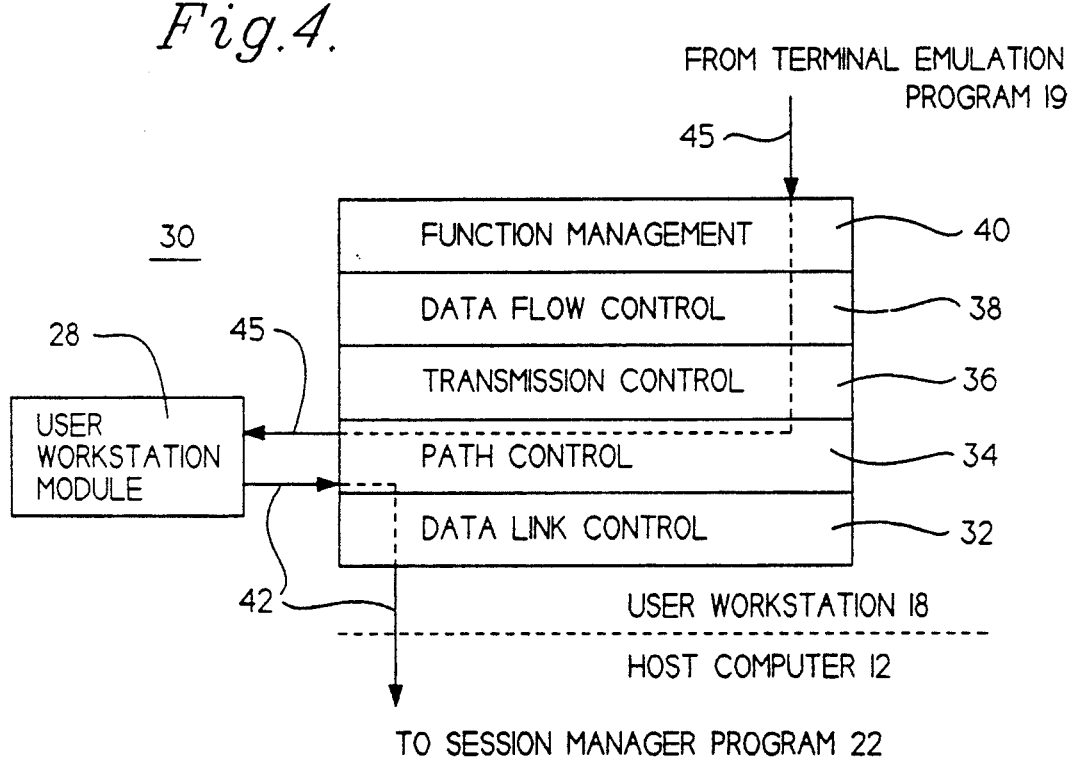
FIG. 4 illustrates the interface between the user workstation module of the present invention performing multiplexing processing and the *IBM Systems Network Architecture Protocol Stack* of the terminal emulation program.

The user workstation module 28 of multiplexing program 25 of the present invention operates in conjunction with the SNA Protocol Stack 30 of user workstation 18 as illustrated in FIGS. 3 and 4. A data transmission packet 42 (described more fully hereinbelow) directed from the session manager program 22 to terminal emulation program 19 enters the SNA Protocol Stack 30 of user workstation 18 at the DLC level 32. The data transmission packet 42 then passes through the DLC level 32 and enters the PC level 34. At the PC level 34, the data transmission packet 42 is intercepted by the user workstation module 28 of multiplexing program 25 which performs certain demultiplexing functions on data transmission packet 42 as is described more fully hereinbelow. After demultiplexing of data transmission packet 42 is completed, user workstation module 28 passes the demultiplexed data packet 43 back to the SNA Protocol Stack 30 at the PC level 34. The demultiplexed data packet 43 is then passed through the TC level 36, the DFC level 38 and the FM level 40 to then be transmitted to terminal emulation program 19.

An unmultiplexed data packet 45 directed from the terminal emulation program 19 to session manager program 22 is processed in a similar but reverse fashion. The unmultiplexed data packet 45 enters the SNA Protocol Stack 30 at the FM level 40 and progresses through the DFC level 38 and the TC level 36 to the PC level 34. At the PC level 34, unmultiplexed data packet 45 is intercepted by the user workstation module 28 of multiplexing program 25, is multiplexed by the user workstation module 28 (as is described more fully hereinbelow) and is then passed back to the PC level 34. The data transmission packet 42 (the result of the multiplexing process) then progresses through the DLC level 32 to then be passed to the communications software (not shown) for transmission to session manager program 22.

The host computer module 26 of multiplexing program 25 operates in conjunction with the SNA Protocol Stack 30 of host computer 12 by receiving data transmission packets 42 transmitted from terminal emulation program 19 after passing through all levels of SNA Protocol Stack 30 and emerging from the FM level 40.

Data Transmission Packets

Various types of data transmission packets 42 are transmitted by the host computer module 26 from host computer 12 to user workstation 18 and by the user workstation module 28 from user workstation 18 to the host computer 12. Again, while the system and method of the present invention can be implemented in any timesharing computer system environment, the preferred embodiment described herein, as it relates to data transmission packets 42, will be described in relation to the IBM SNA environment. Further, those of ordinary skill in the art will recognize that while, for the sake of simplicity of discussion, the host computer module 26 and the user workstation module 28 are described throughout the following explanation as "transmitting" data transmission packets 42, the data transmission packets 42 are passed to communications software (not shown) in host computer 12 and user workstation 18 for actual transmission.

Figure 5:
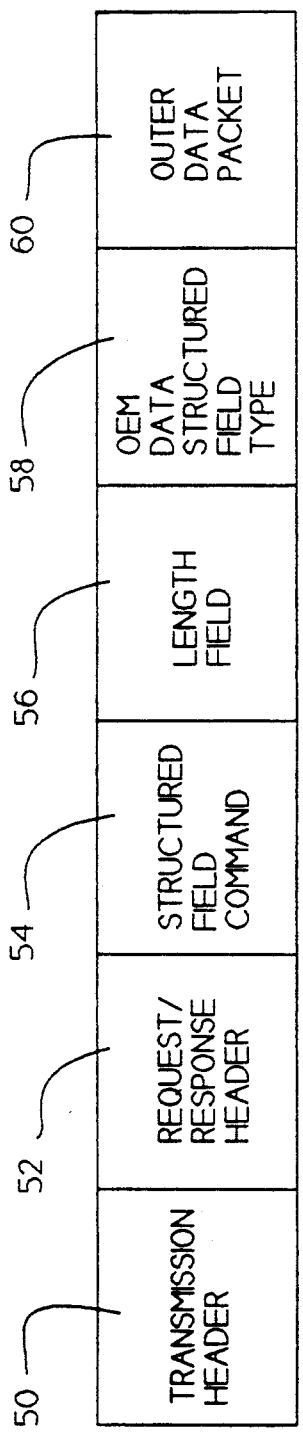
FIG. 5 illustrates a data transmission packet.

FIG. 5 illustrates the structure of a data transmission packet 42. Data transmission packet 42 includes a Transmission Header 50, Request/Response Header 52, Structured Field Command 54, Length Field 56, OEM Data Structured Field Type 58 and Outer Data Packet 60. Those of ordinary skill in the art will recognize that all fields of the data transmission packet 42 except for the Outer Data Packet 60 correspond to the fields of a Path Information Unit ("PIU") of the IBM SNA protocol. The Structured Field Command 54 is assigned a hexadecimal value of "F3" Write Structured Field Command in data transmission packets 42 transmitted from host computer module 26 to user workstation module 28 and a hexadecimal value of "88" Action Identifier Command in data transmission packets 42 transmitted from user workstation module 28 to host computer module 26. The OEM Data Structured Field Type 58 (hexadecimal "0F1F") indicates that all data which follows the command appears in a format compatible with the protocol of the device or, in the case of the host computer module 26 and user workstation module 28 of the present invention, software receiving the data. Thus, the Outer Data Packet 60 is a field of a PIU that can be formatted according to the requirements of the multiplexing program 25.

Figure 6:
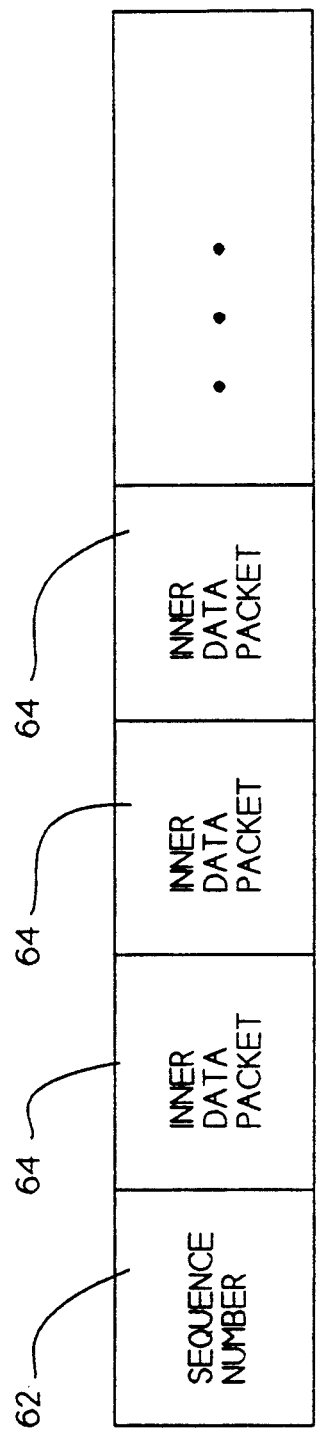
FIG. 6 illustrates an outer data packet which is transmitted between a host computer module and the user workstation module of the present invention.

FIG. 6 illustrates the details of Outer Data Packet 60. Outer Data Packet 60 includes a Sequence Number 62 and one or more Inner Data Packets 64. Sequence Number 62 is a unique identifying number generated by host computer module 26. The Sequence Number 62 is incremented by one with each transmission of an Outer Data Packet 60 from host computer module 26 to user workstation module 28. User workstation module 28 places the last Sequence Number 62 that it has received in the last Outer Data Packet 60 transmitted from host computer module 26 to user workstation module 28 into each Outer Data Packet 60 that it transmits back to host computer module 26.

Figure 7:
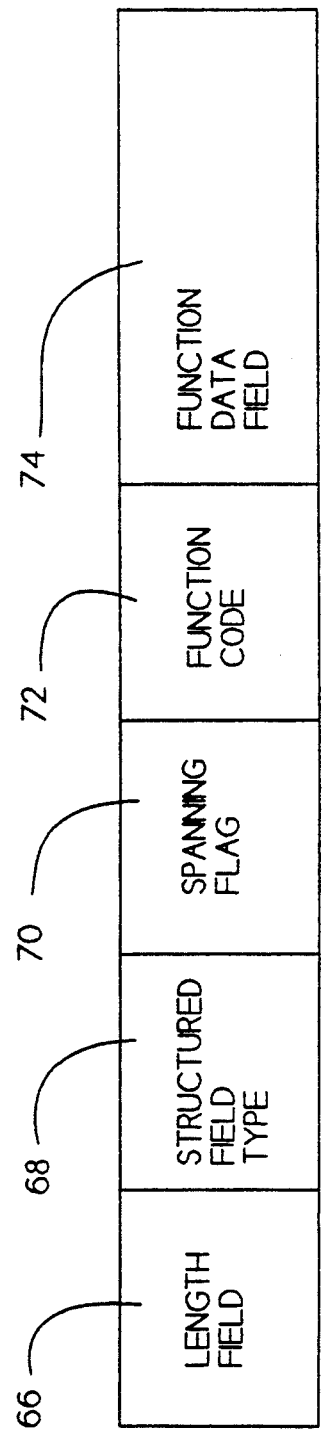
FIG. 7 illustrates an inner data packet which is transmitted between the host computer module and the user workstation module of the present invention.

The details of Inner Data Packet 64 are illustrated in FIG. 7. The first element of the Inner Data Packet 64 is a Length Field 66. The Length Field 66 contains the length (in bytes) of the Inner Data Packet 64. The Structured Field Type 68 is included to give the Inner Data Packet 64 the structure of a 3270-type structured field data packet. An Inner Data Packet 64 may be larger than an Outer Data Packet 60 and, thus, may span multiple Outer Data Packets 60. Each portion of the spanned Inner Data Packet 64 is referred to as a segment. The Spanning Flag 70 of Inner Data Packet 64 indicates whether spanning has taken place and, if so, indicates the position of the segment within the series of segments. The permitted values of Spanning Flag 70 and their meanings are illustrated in Table I below.

TABLE I

| | |
| --- | --- |
| Hexadecimal 03 = | only segment |
| Hexadecimal 02 = | first but not last segment |
| Hexadecimal 01 = | last but not first segment |
| Hexadecimal 00 = | neither first nor last segment |

In addition to transmitting 3270-type datastreams between the host computer module 26 and the user workstation module 28, Inner Data Packets 64 are utilized to transmit control information. Function Code 72 indicates the type of information that appears in Function Data Field 74. The permitted values and meanings of the Function Code 72 are shown below in Table II.

TABLE II

| | |
| --- | --- |
| Hexadecimal 00 = | Null Inner Data Packet |
| Hexadecimal 01 = | Identify Inner Data Packet |
| Hexadecimal 02 = | Session List Inner Data Packet |
| Hexadecimal 03 = | Session Manager Program Command Inner Data Packet |
| Hexadecimal 04 = | Open Window Inner Data Packet |
| Hexadecimal 05 = | Close Window Inner Data Packet |
| Hexadecimal 07 = | 3270 Datastream Inner Data Packet |

The structure of the Function Data Field 74 for each of the function codes is described below.

1. Identify Inner Data Packet

Figure 8:
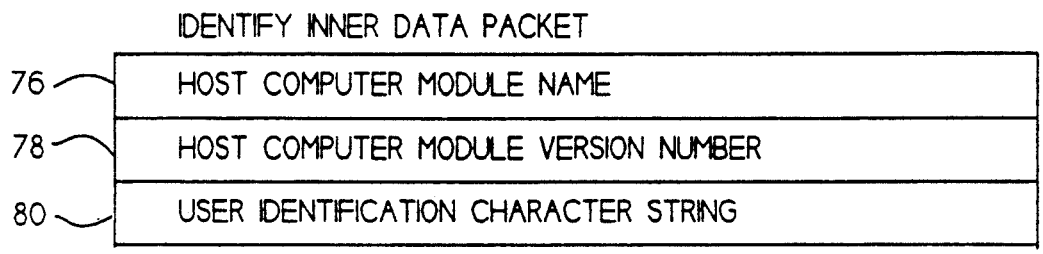
FIG. 8 illustrates a Function Data Field portion of Identify Inner Data Packet.

The Function Data Field 74 of Identification Inner Data Packet 64 (FIG. 8) is comprised of the following components: (1) Host Computer Module Name 76; (2) Host Computer Module Version Number 78; and (3) User Identification Character String 80. Host Computer Module Name 76 and Host Computer Module Version Number 78 identify Host Computer Module 26. User Identification Code 80 is provided by the user during the sign-on process to session manager program 22.

2. Session List Inner Data Packet

Figure 9:
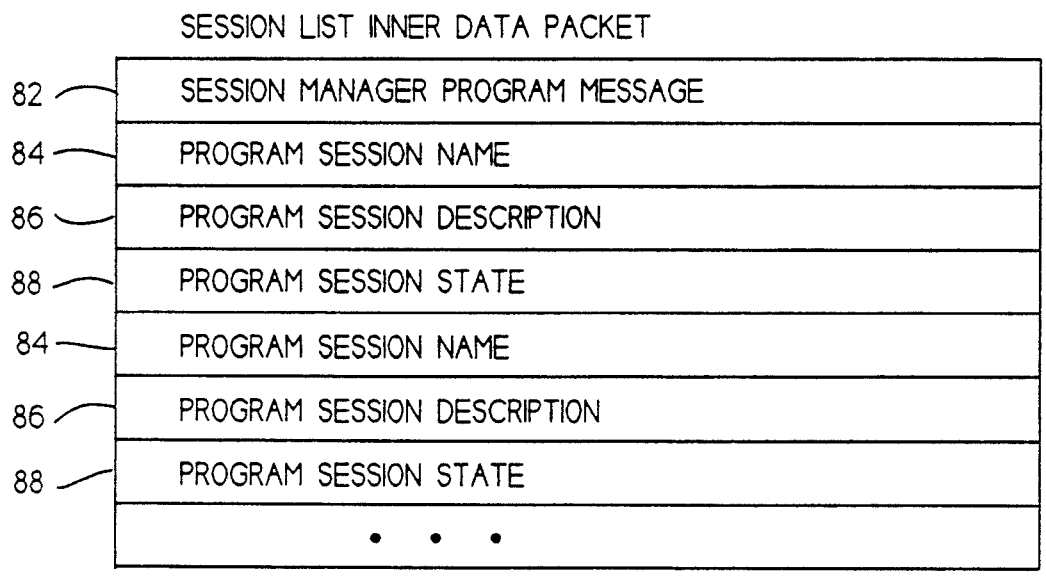
FIG. 9 illustrates the Function Data Field portion of Session List Inner Data Packet.

The Function Data Field 74 of Session List Inner Data Packet 64 (FIG. 9) is comprised of the following components: (1) Session Manager Program Message 82; (2) Program Session Name 84; (3) Program Session Description 86; and (4) Program Session State 88. One set of entries comprised of Program Session Name 84, Program Session Description 86 and Program Session State 88 are included in the Function Data Field 74 of Session List Inner Data Packet 64 for each host application program 24 available to the user on host computer 12. The Session Manager Program Message 82 is a message reflecting the status of the last open or close session manager program command transmitted from the user workstation module 28 to host computer module 26 for interpretation by session manager program 22.

3. Session Manager Program Command Inner Data Packet

Figure 10:
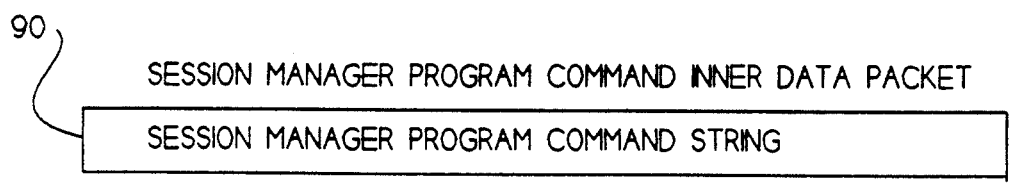
FIG. 10 illustrates the Function Data Field portion of Session Manager Program Command Inner Data Packet.

The Function Data Field 74 of Session Manager Program Command Inner Data Packet 64 (FIG. 10) is comprised of the following component: (1) Session Manager Program Command String 90. The Session Manager Program Command String 90 is a command string sent from the user workstation module 28 to the host computer module 26 for interpretation by session manager program 22.

4. Open Window Inner Data Packet

The Function Data Field 74 of Open Window Inner Data Packet 64 (FIG. 11) is comprised of the following components: (1) Session Manager Program Correlator 92; (2) User Workstation Correlator 94; (3) Program Session Name 96; (4) User Workstation Model Name 98; and (5) BIND Request Unit 100. The Session Manager Program Correlator 92 is the memory address in the internal memory area (not shown) of the host computer module 26 of an Application Session Block (described below) for the host application program 24 for which an application program window 29 is to be opened on user workstation 18. The User Workstation Correlator 94 is the memory address in the internal memory area (not shown) of the user workstation module 28 of the User Workstation Virtual Session Control Block (described below) for the application program window 29 to be opened on user workstation 18. The Program Session Name 96 is the host application program 24 identifier specified by the user and is used by terminal emulation program 19 as the title for the application program window 29 on user workstation 18. The User Workstation Model Name 98 is used by the host computer module 26 and user workstation module 28 to open a window on user workstation 18 with the characteristics (number of lines, number of columns, graphics support, etc.) of user workstation 18 specified by the user. Those of ordinary skill in the art will recognize that BIND Request Unit 100 is used in the IBM SNA protocol to establish a program session between session manager program 22 and a host application program 24.

5. Close Window Inner Data Packet

Figure 11:
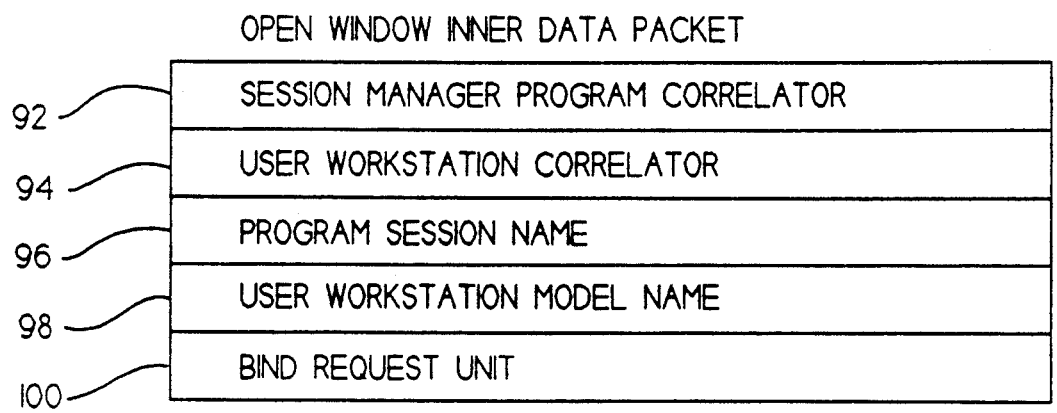
FIG. 11 illustrates the Function Data Field portion of Open Window Inner Data Packet.
Figure 12:
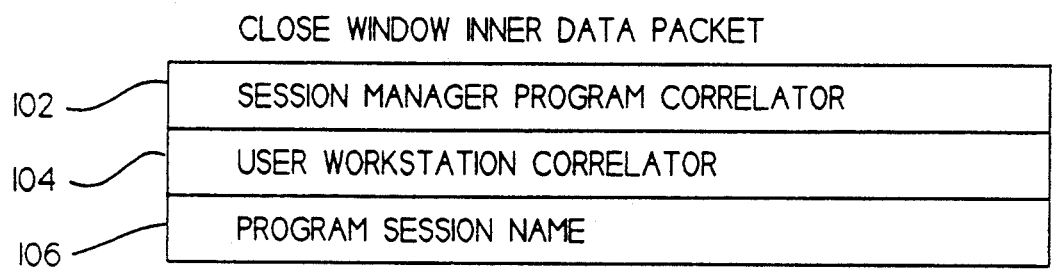
FIG. 12 illustrates the Function Data Field portion of Close Window Inner Data Packet.

The Function Data Field 74 of Close Window Inner Data Packet 64 (FIG. 12) is comprised of the following components: (1) Session Manager Program Correlator 102; (2) User Workstation Correlator 104; and (3) Program Session Name 106. Each of these components has been described in relation to the Function Data Field 74 of Open Window Inner Data Packet 64 (FIG. 11).

6. 3270 Datastream Inner Data Packet

The Function Data Field 74 of 3270 Datastream Inner Data Packet 64 (FIG. 13) is comprised of the following components: (1) Session Manager Program Correlator 108; (2) User Workstation Correlator 110; (3) Sequence Number 112; and (4) Data Packet 114. The Session Manager Program Correlator 108, User Workstation Correlator 110 and Sequence Number 112 are described above. The Data Packet 114 is equivalent to a Basic Information Unit ("BIU") in the IBM SNA protocol.

Host Computer Module Control Blocks

The following sections describe memory control blocks utilized by the host computer module 26 to control the program session established between the session manager program 22 and the terminal emulation program 19. Each of the memory control blocks described below reside in the internal memory area (not shown) of the host computer module 26 in host computer 12.

1. Terminal Session Block

Figure 14:
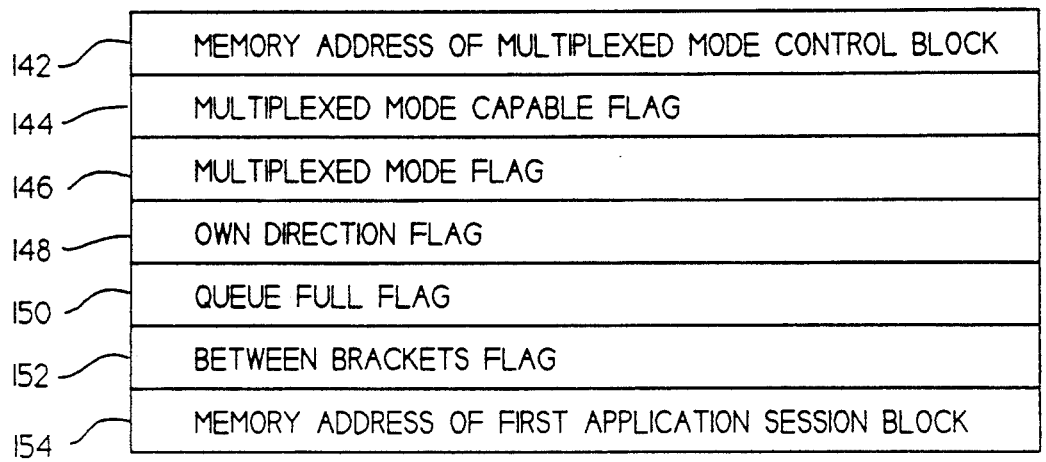
FIG. 14 illustrates a Terminal Session Block utilized in conjunction with a multiplexing program of the present invention.

FIG. 14 illustrates a Terminal Session Block 140. The Terminal Session Block 140 describes the communications capabilities of the user workstation 18 and the state of the program session established between the session manager program 22 and the terminal emulation program 19. The Terminal Session Block includes, among others, the following components: (1) memory address of Multiplexed Mode Control Block (described below) 142; (2) Multiplexed Mode Capable Flag 144; (3) Multiplexed Mode Flag 146; (4) Own Direction Flag 148; (5) Queue Full Flag 150; (6) Between Brackets Flag 152; and (7) memory address of the first element in a linked list of Application Session Blocks (described below) 154. The Multiplexed Mode Capable Flag 144 is true (set to logical 1) if the user workstation 18 is capable of operating in multiplexed mode, i.e., with the multiplexing program 25 of the present invention. The Multiplexed Mode Flag 146 is true (set to logical 1) if the user workstation 18 is actually operating in multiplexed mode. The Own Direction Flag 148 and Between Brackets Flag 152 operate according to the IBM SNA protocol for half-duplex flip-flop communications between host computer 12 and user workstation 18 as is well known to those of ordinary skill in the art. The Queue Full Flag 150 is true (set to logical 1) when the inner data packet queue (described more fully hereinbelow) is full.

2. Multiplexed Mode Control Block

Figure 15:
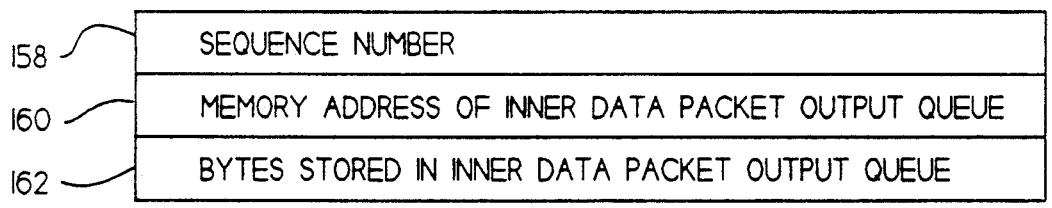
FIG. 15 illustrates a Multiplexed Mode Control Block utilized in conjunction with the multiplexing program of the present invention.

The Multiplexed Mode Control Block 156, illustrated in FIG. 15, contains information relating to the multiplexed mode program session, i.e., the program session utilizing multiplexing program 25, established between session manager program 22 and terminal emulation program 19. The Multiplexed Mode Control Block 156 includes, among others, the following components: (1) Sequence Number 158; (2) memory address of inner data packet output queue (described more fully hereinbelow) 162; and (3) total number of bytes stored in inner data packet queue (described more fully hereinbelow) 161. The function of Sequence Number 158 has been described above. The inner data packet queue (described more fully hereinbelow) is a first-in-first-out queue of inner data packets 64 stored for transmission to user workstation module 28.

3. Application Session Block

Figure 16:
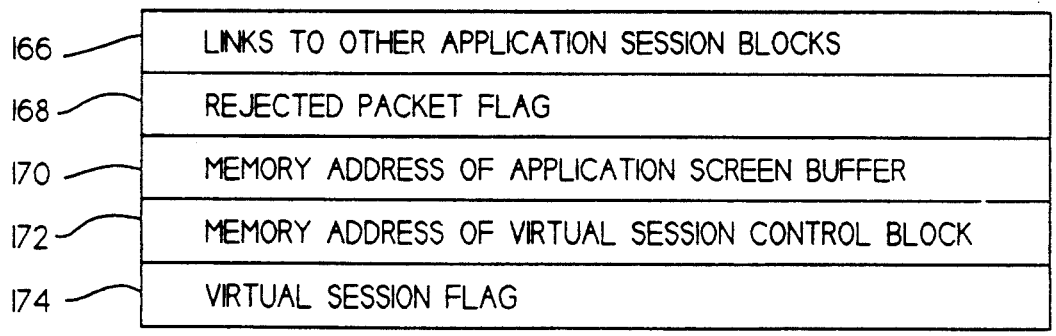
FIG. 16 illustrates an Application Session Block utilized in conjunction with the multiplexing program of the present invention.

FIG. 16 illustrates an Application Session Block 164. The Application Session Block 164 contains information relating to the state of the program session between the session manager program 22 and a single host application program 24. One Application Session Block 164 is created for each program session established between session manager program 22 and a host application program 24. The Application Session Block 164 includes, among others, the following components: (1) memory address links to other Application Session Blocks 166; (2) Rejected Packet Flag 168; (3) memory address of application screen buffer 170; (4) memory address of Virtual Session Control Block 172; and (5) Virtual Session Flag 174. The Rejected Packet Flag 168 is true (set to logical 1) when the inner data packet queue (described more fully hereinbelow) is full and a host application program 24 has data to transmit to the user workstation 18. The Virtual Session Flag 174 is true (set to logical 1) when an Open Window Inner Data Packet 64 (FIG. 11) for the particular host application program 24 associated with a particular Application Session Block 164 has been received by the host computer module 26 from the user workstation module 28.

4. Virtual Session Control Block

A Virtual Session Control Block 176 is illustrated in FIG. 17. The Virtual Session Control Block 176 contains information relating to the state of the "virtual" program session established between a host application program 24 and terminal emulation program 19. The Virtual Session Control Block 176 contains, among others, the following component: (1) User Workstation Correlator 178; and (2) memory address of inbound inner data packet segment queue 179. The function of the Workstation Correlator 178 has been described above. The function of the inbound inner data packet segment queue will be described below.

User Workstation Module Control Blocks

The following sections describe memory control blocks utilized by the user workstation module 28 to control the program session established between the session manager program 22 and the terminal emulation program 19. Each of the memory control blocks described below resides in the internal memory area (not shown) of the user workstation module 28 in user workstation 18.

1. User Workstation Session Control Block

The User workstation Session Control Block 182 is illustrated in FIG. 18. The User Workstation Session Control Block 182 contains information relating to the program session established between the terminal emulation program 19 and the session manager program 22. The User Workstation Session Control Block 182 contains, among others, the following components: (1) memory address of output buffer 184; (2) memory address of inner data packet output queue 186; (3) memory address of session list block 188; (4) Multiplexed Mode Flag 190; (5) Own Direction Flag 192; (6) Sequence Number 194; (7) Between Brackets Flag 196; (8) memory address of buffer for individual segments of inner data packets 198; (9) User Identification Character String 200; and (10) table of memory addresses of User Workstation Virtual Session Control Blocks (described below) 202. The output buffer is a memory block in the internal memory area (not shown) of user workstation module 28 used for building data transmission packets 42. The inner data packet output queue will be described more fully below. The session list block is a memory block in the internal memory area (not shown) of user workstation module 28 containing a list of host application programs 24 available to the user. The function of the segment buffer will be described below in conjunction with the operation of multiplexing program 25.

2. User Workstation Virtual Session Control Block

FIG. 19 illustrates a User Workstation Virtual Session Control Block 204. The User Workstation Virtual Session Control Block 204 contains information relating to the "virtual" program session established between the terminal emulation program 19 and a host application program 24. The User Workstation Virtual Session Control Block 204 includes, among others, the following components: (1) Session Manager Program Correlator 206; (2) Virtual Terminal Logical Unit Number 208; (3) Host Application Logical Unit Number 210; and (4) User Workstation Correlator 207. The Session Manager Correlator 206 has been described above. Virtual Terminal Logical Unit Number 208 and Application Program Logical Unit Number 210 are identifiers used to transmit and receive data transmission packets 42 between host computer module 26 and user workstation module 28 and render these transmission data packets 42 compatible with the IBM SNA protocol.

Multiplexing Program Operation

Figure 20A:
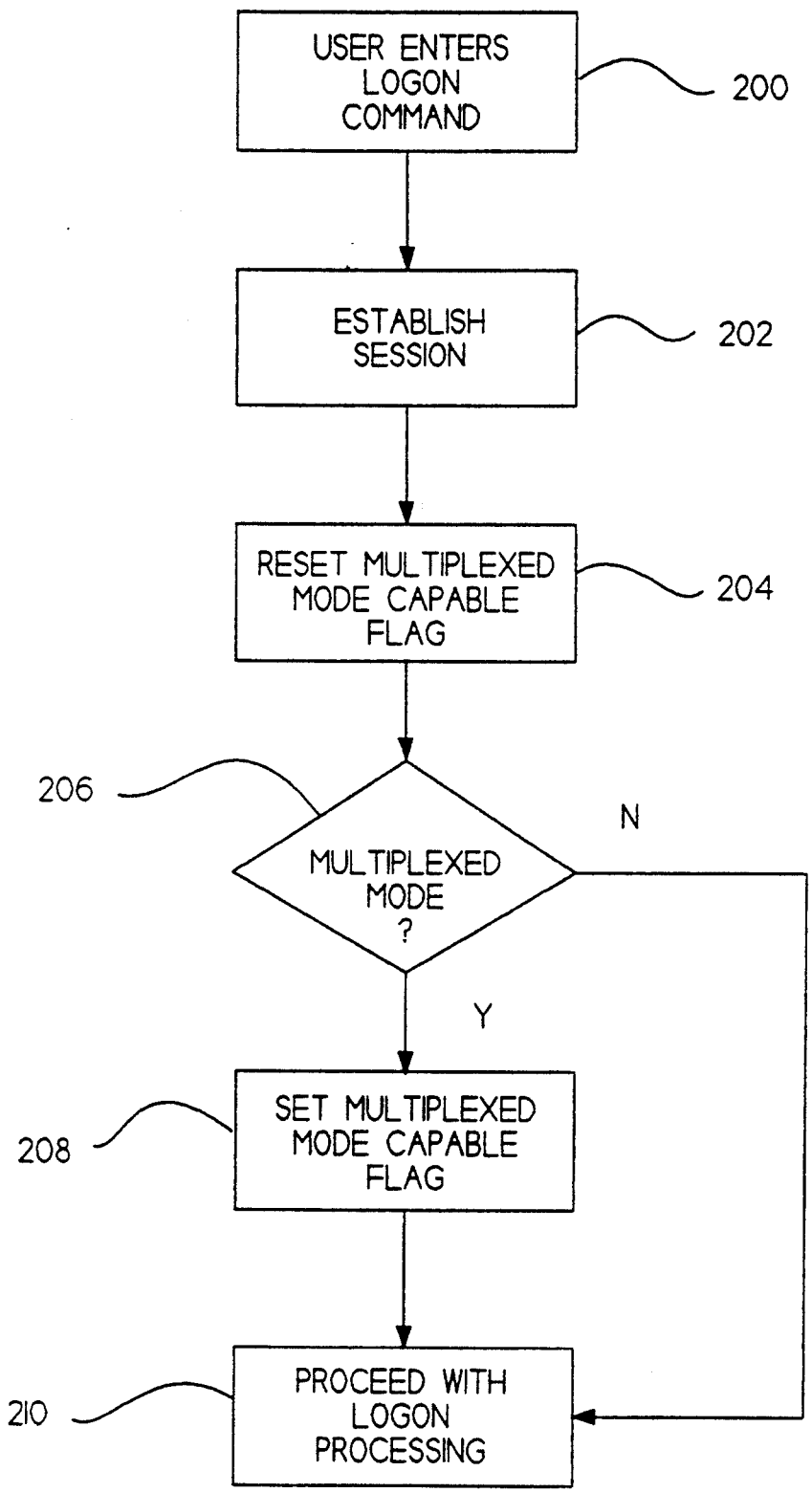

The flow chart of FIG. 20a illustrates the logon process to the multiplexing program 25 of the present invention. During the logon process, the host computer module 26 of the multiplexing program 25 determines whether the user workstation 18 is capable of operating in cooperation with multiplexing program 25, i.e., in a "multiplexed mode". In step 200, the user workstation module 28 prompts the user (via the video display screen (not shown)) to enter a logon command (via the keyboard (not shown)). After the user enters the logon command, program control continues with step 202 where the host computer module 26, in cooperation with session manager program 22, establishes a program session between the session manager program 22 and the terminal emulation program 19. The host computer module 26 also receives a data block containing definitions of the capabilities of user workstation 18. Those of ordinary skill in the art will recognize this data block as the CINIT RU of the IBM SNA protocol. To establish the program session, the host computer module 26, among other things, creates a Terminal Session Block 140 (FIG. 14) using the contents of the CINIT RU. The Terminal Session Block 140 uniquely identifies the user workstation 18 and the state of the program session established between the session manager program 22 and the terminal emulation program 19.

In step 204, the Multiplexed Mode Capable Flag 144 in Terminal Session Block 140 is reset by host computer module 26. Program control then continues with step 206 where the host computer module 26 determines whether the user workstation 18 is capable of running in multiplexed mode. First, the host computer module 26 determines whether the user workstation 18 is "query able" (IBM 3270 technology). This information is included in the CINIT RU. If the user workstation module 18 is "query able", a query datastream is transmitted by host computer module 26 to user workstation module 28. If the response datastream transmitted by the user workstation module 28 to host computer module 26 includes an OEM Data Structured Field Type and a character string identifying the user workstation module 28, then the user workstation 28 is capable of operating in multiplexed mode. If the host computer module 26 determines that the user workstation 18 is capable of operating in multiplexed mode, program control continues with step 208 where the host computer module 26 sets to true (sets to logical 1) the Multiplexed Mode Capable Flag 144 in the Terminal Session Block 140. If the host computer module 26 determines, in step 206, that the user workstation 18 is not capable of operating in multiplexed mode, or, following execution of step 208, program control continues with step 210 where program control is transferred to the session manager program 22 for the completion of logon processing.

Figure 20B:
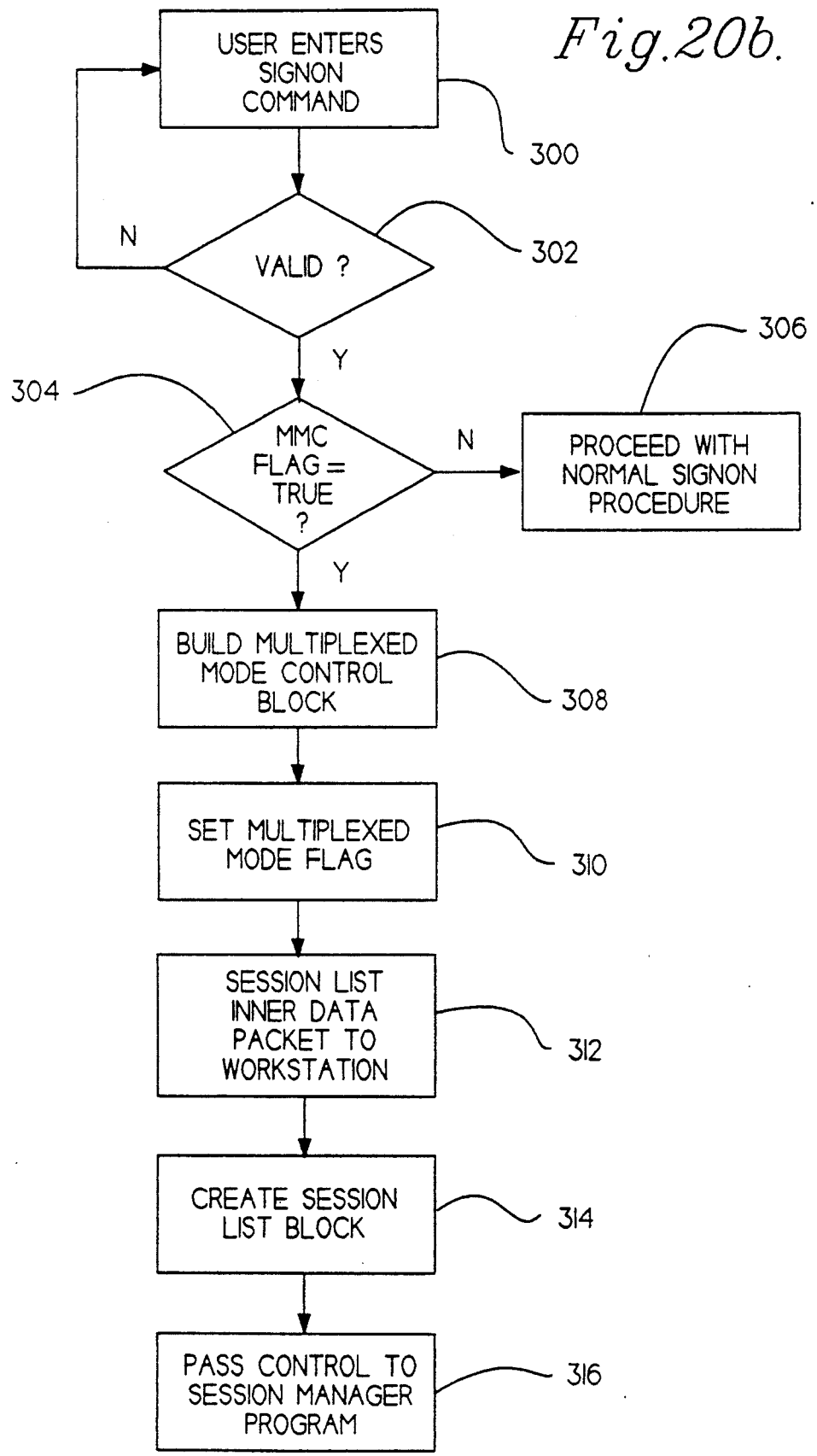

After the logon process is completed by the session manager program 22, program control continues with step 300 of the flow chart of FIG. 20b where the signon process is initiated. The signon process permits the user to gain access to the session manager program 22 executing on the host computer 12. In step 300 of the flow chart of FIG. 20b, the user enters a user identification character string and password at the signon screen generated by the session manager program 22. In step 302, the session manager program 22 validates the user identification character string and password; if valid, program control continues with step 304. Otherwise, program control is returned to step 300 for reentry of the user identification character string and password.

In step 304, the host computer module 26 determines whether the Multiplexed Mode Capable Flag 144 in Terminal Session Block 140 is true (set to logical one 1). If the Multiplexed Mode Capable Flag 144 is not true, program control continues with Step 306 where program control is passed by the host computer module 26 to the session manager program 22 where the normal (non-multiplexed mode) signon procedure continues. If, however, the host computer module 28 determines in step 304 that the Multiplexed Mode Capable Flag 144 is true, program control continues with step 308. In step 308, the following tasks are performed by host computer module 26: (1) build a Multiplexed Mode Control Block 156 (FIG. 15); (2) store the address of the Multiplexed Mode Control Block 156 in item 142 of the Terminal Session Block 140 (FIG. 14); (3) set to true (set to logical 1) the Multiplexed Mode Flag 146 in the Terminal Session Block 140; (4) initialize (to binary 1) the Sequence Number 158 in Multiplexed Mode Control Block 156; and (5) direct a data transmission packet 42 including an Identify Inner Data Packet 64 (FIG. 8) to user workstation module 28 (see the flow chart shown in FIG. 20f and the discussion appearing below for a description of how data transmission packets 42 are transported between the host computer module 26 and the user workstation module 28).

Program control then continues with step 310 where the user workstation module 28 receives the Identify Inner Data Packet 64 which causes the user workstation module 28 to place the user workstation 18 into multiplexed mode by setting to true (setting to logical 1) the Multiplexed Mode Flag 190 in the User Workstation Session Control Block 182 (FIG. 18). The user workstation module 28 then transmits a Null Inner Data Packet 64 (a Null Inner Data Packet does not contain a Function Data Field 74) to the host computer module 26. In step 312, the host computer module 26 receives the Null Inner Data Packet 64 and transmits a Session List Inner Data Packet 64 (FIG. 9) to user workstation module 28.

Program control continues with step 314 where the user workstation module 28 receives the Session List Inner Data Packet 64 and stores the information in a session list block, the memory address of which is stored in item 188 of User Workstation Session Control Block 182 (FIG. 18). User workstation module 28 then transmits a Null Inner Data Packet 64 to host computer module 26. Program control then continues with step 316 where the host computer module 26 receives the Null Inner Data Packet 64 from user workstation module 28 and then passes control to session manager program 22 to permit any program sessions initiated by session manager program 22 to be processed (see discussion relating to activation of "virtual" program sessions below).

The flow chart of FIG. 20c illustrates the procedure by which a "virtual" program session is activated. A "virtual" program session is a program session established between a host application program 24 and terminal emulation program 19. The "virtual" program session is built upon two "real" program sessions: (1) a "real" program session established between the session manager program 22 and the host application program 24; and (2) a "real" program session established between the session manager program 22 and the terminal emulation program 19. The datastream transmitted between the host application program 24 and the terminal emulation program 19 is encoded in the data transmission packet 42 exchanged between the host computer module 26 and the user workstation module 28.

In step 400, a user enters a request to activate a program session with a host application program 24 by selecting the application program name from a list displayed on the video display screen (not shown) of user workstation 18. This list is constructed from the session list block, the memory address of which is stored in item 188 of User Workstation Session Control Block 182 (FIG. 18). A Session Manager Program Command Inner Data Packet 64 (FIG. 10) is constructed and transmitted to the host computer module 26. The Session Manager Program Command Inner Data Packet 64 contains a session manager program command to activate a program session between session manager program 22 and the host application program 24 selected from the list displayed on the video display screen (not shown) of user workstation 18. Step 402 of the flow chart of FIG. 20c indicates that a program session between session manager program 22 and a host application program 24 can be initiated by the session manager program 22.

Following either step 400 or step 402, program control continues with step 404 where the host computer module 26 receives the Session Manager Program Command Inner Data Packet 64 containing the activate program session command. The host computer module 26 passes the command to session manager program 22 and then creates an Application Session Block 164 (FIG. 16). The Application Session Block 164 becomes a part of the linked list of Application Session Blocks 164, the memory address of the first element in the linked list being stored in item 154 of Terminal Session Block 140 (FIG. 14). The session manager program 22 then activates the requested program session in a manner that is well known to those of ordinary skill in the art. When a BIND RU is received from host application program 24, host computer module 26 creates a Virtual Session Control Block 176 (FIG. 17) for this program session and its memory address is stored in item 172 of Application Session Block 164. Finally, the host computer module 26 transmits an Open Window Inner Data Packet 64 (FIG. 11) to user workstation module 28.

Program control continues with step 406 where the user workstation module 28 receives the Open Window Inner Data Packet 64. The user workstation module 28 builds a User Workstation Virtual Session Control Block 204 (FIG. 19). Terminal emulation program 19 then opens an application program window 29 on user workstation 18. The user workstation module 28 performs certain functions that simulate the action that the terminal emulation program 19 would expect to be taken by the host computer 12 (pursuant to the IBM SNA protocol) to activate a program session. Those of ordinary skill in the art will recognize that this simulation consists of sending to the terminal emulation program 19 an ACTLU RU (activate a logical unit), BIND RU (information relating to the program session characteristics) and an SDT RU (a signal that the host application program is ready to accept program session data). The BIND RU information was originally transmitted from the host application program 24 to the session manager program 22 and was then transmitted by the host computer module 26 to the user workstation module 28 in the Open Window Inner Data Packet 64.

Program control continues with step 408 where the user workstation module 28 determines whether all actions initiated in step 406 were successfully completed. If not, program control continues with step 410 where the application program window 29 on user workstation 18 is closed, a Close Window Inner Data Packet 64 (FIG. 12) is transmitted from user workstation module 28 to host computer module 26 and the User Workstation Virtual Session Control Block 204 (FIG. 19) is deleted from the memory area (not shown) of the user workstation module 28. In step 412, host computer module 26 receives the Close Window Inner Data Packet 64 and transmits an inactivate program session command to session manager program 22 which, in turn, terminates the program session between the application program 24 and session manager 22 in a manner that is well known to those of ordinary skill in the art.

If the user workstation module 28 determines, in step 408, that the actions initiated in step 406 were successfully completed, program control continues with step 414 where the user workstation module 28 returns an Open Window Inner Data Packet 64 (FIG. 11) to host computer module 26. Program control continues with step 416 where the host computer module 26 receives the Open Window Inner Data Packet 64 and sets to true (sets to logical 1) the Virtual Session Flag 174 in the Application Session Block 164 (FIG. 16) associated with the program session that has just been established.

Figure 20E:
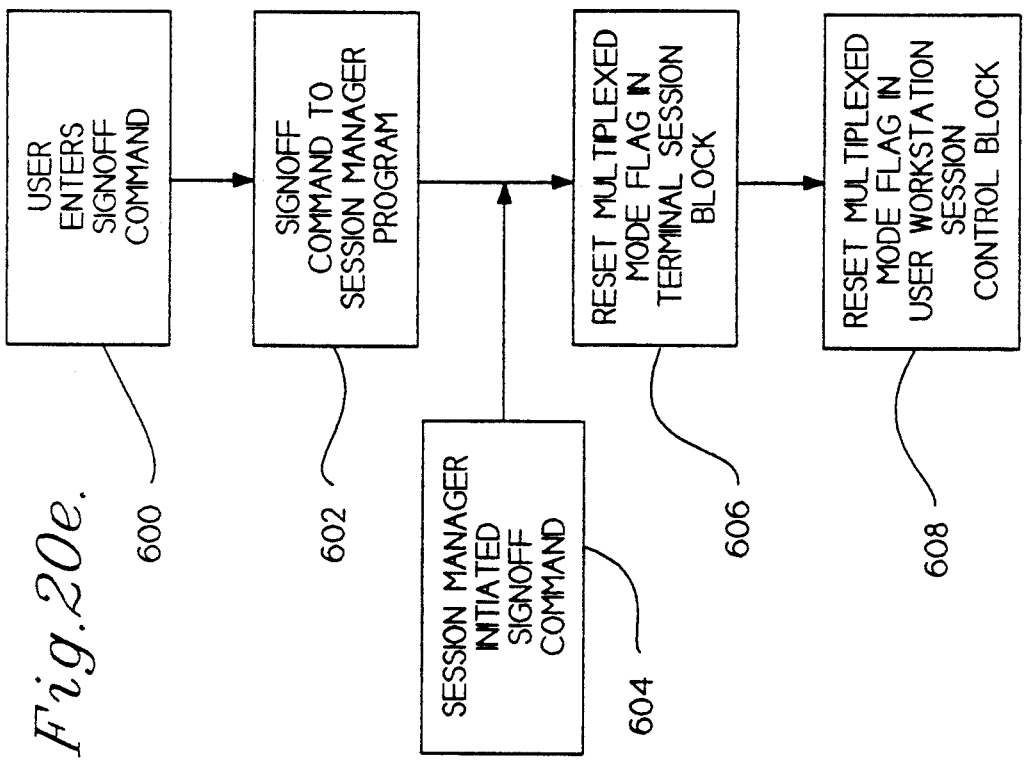
Figure 20D:
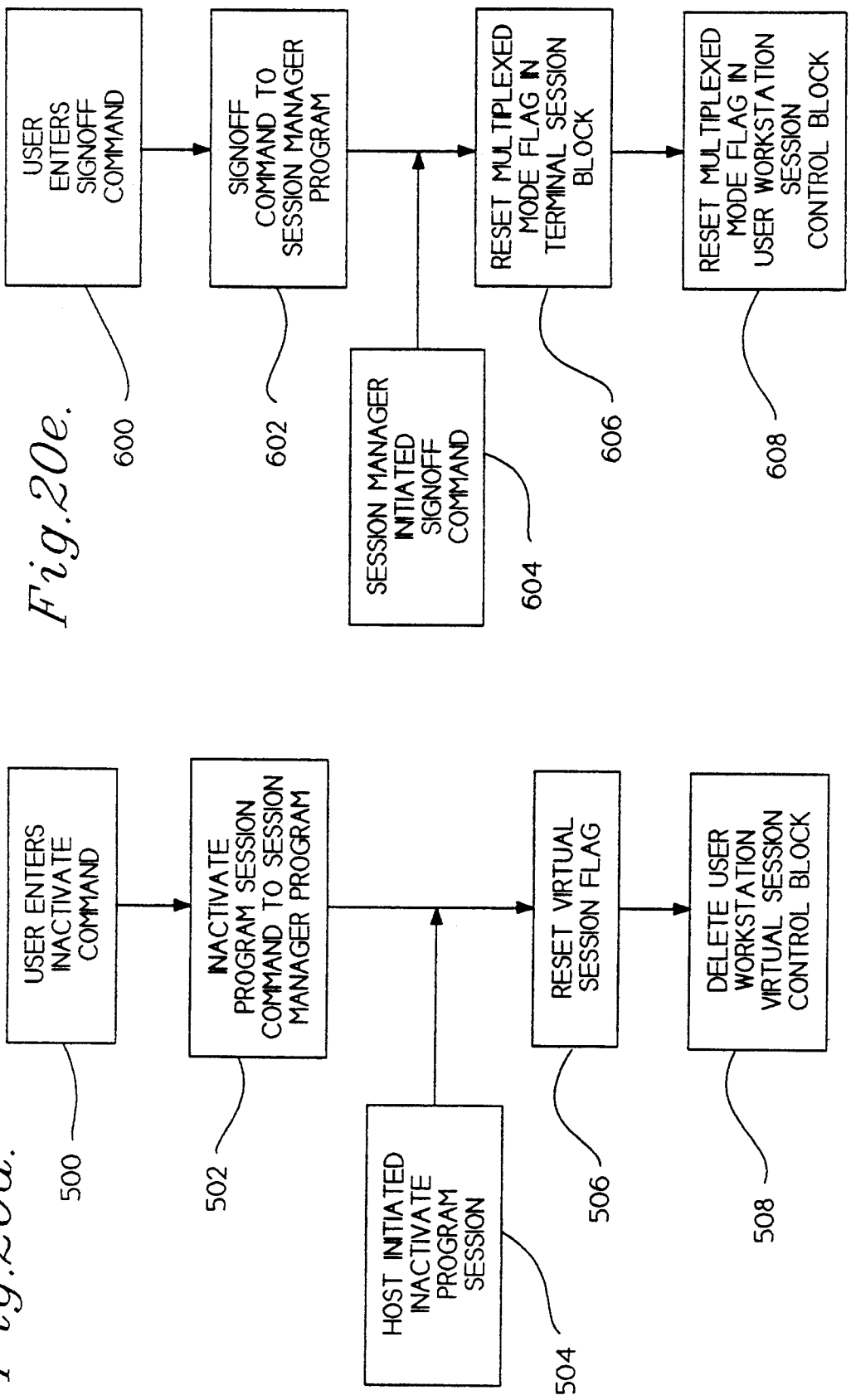

The procedure for inactivating an established "virtual" program session is illustrated in the flow chart of FIG. 20d. Program control begins at step 500 where a user enters a command at user workstation 18 requesting that a "virtual" program session be inactivated. Using information in the User Workstation Virtual Session Control Block 204 (FIG. 19), the user workstation module 28 builds a Session Manager Program Command Inner Data Packet 64 (FIG. 10) containing an inactivate program session command. The Session Manager Program Command Inner Data Packet 64 is transmitted to the host computer module 26. Program control continues with step 502 where the host computer module 26 receives the Session Manager Program Command Inner Data Packet and transmits the inactivate program session command to session manager program 22. The session manager program 22 requests that the program session between host application program 24 and session manager program 22 be terminated by issuing a TERMSESS command to VTAM (IBM SNA protocol) in a manner that is well known to those of ordinary skill in the art. A program session between host application program 24 and session manager program 22 can also be terminated when the user normally ends the host application program 24 (step 504). In this case, the host application program 24 issues a CLSDST command to VTAM (IBM SNA protocol). Following either step 502 or 504, VTAM (IBM SNA protocol) terminates the program session between session manager program 22 and host application program 24 and notifies the session manager program 22 that the program session has terminated. Program control continues with step 506 where host computer module 26 builds a Close Window Inner Data Packet 64 (FIG. 12) using the information stored in the Application Session Block 164 (FIG. 16) and the Virtual Session Control Block 176 (FIG. 17). The Virtual Session Flag 174 in the Application Session Block 164 is set to false (set to logical 0). The Close Window Inner Data Packet 64 is transmitted from the host computer module 26 to user workstation module 28. In step 508, the user workstation module 28 receives the Close Window Inner Data Packet 64 and deletes the User Workstation Virtual Session Control Block 204 (FIG. 19) from the memory area (not shown) of the user workstation module 18; terminal emulation program 19 then closes the application program window 29.

FIG. 20e illustrates the procedure for terminating multiplexed mode operation. In step 600, the user enters a signoff command at user workstation 18. User workstation module 28 builds a Session Manager Program Command Inner Data Packet 64 (FIG. 10) containing a signoff command. The Session Manager Program Command Inner Data Packet 64 is transmitted to the host computer module 26. Program control continues with step 602 where the host computer module 26 receives the Session Manager Program Command Inner Data Packet 64 and transmits the signoff command to session manager program 22. Step 604 illustrates the possibility that the session manager program 22 can generate a signoff command. Following either step 602 or step 604, program control continues with step 606 where the Multiplexed Mode Flag 146 in the Terminal Session Block 140 (FIG. 14) is set to false (set to logical 0) and the Virtual Session Flag 174 in each Application Session Block 164 (FIG. 16) linked to the Terminal Session Block 140 by the memory address stored in item 154 of the Terminal Session Block 140 is set to false (set to logical 0). The session manager program 22 transmits a signon screen to the user workstation module 28 for display by terminal emulation program 19. In step 608, the user workstation module 28 receives the signon screen transmitted by the host computer module 26 and transmits the screen to terminal emulation program 19 for display on the video display screen (not shown) of user workstation 18. The user workstation module 28 recognizes that this is not a data transmission packet 42 that contains a Structured Field Command 54 and an OEM Data Structured Field Type 58. The Multiplexed Mode Flag 190 in User Workstation Session Control Block 182 (FIG. 18) is set to false (set to logical 0). The memory addresses of User Workstation Virtual Session Control Blocks 202 in User Workstation Session Control Block 182 (FIG. 18) are cleared and the associated User Workstation Virtual Session Control Blocks 204 (FIG. 19) are deleted.

Figure 20F:
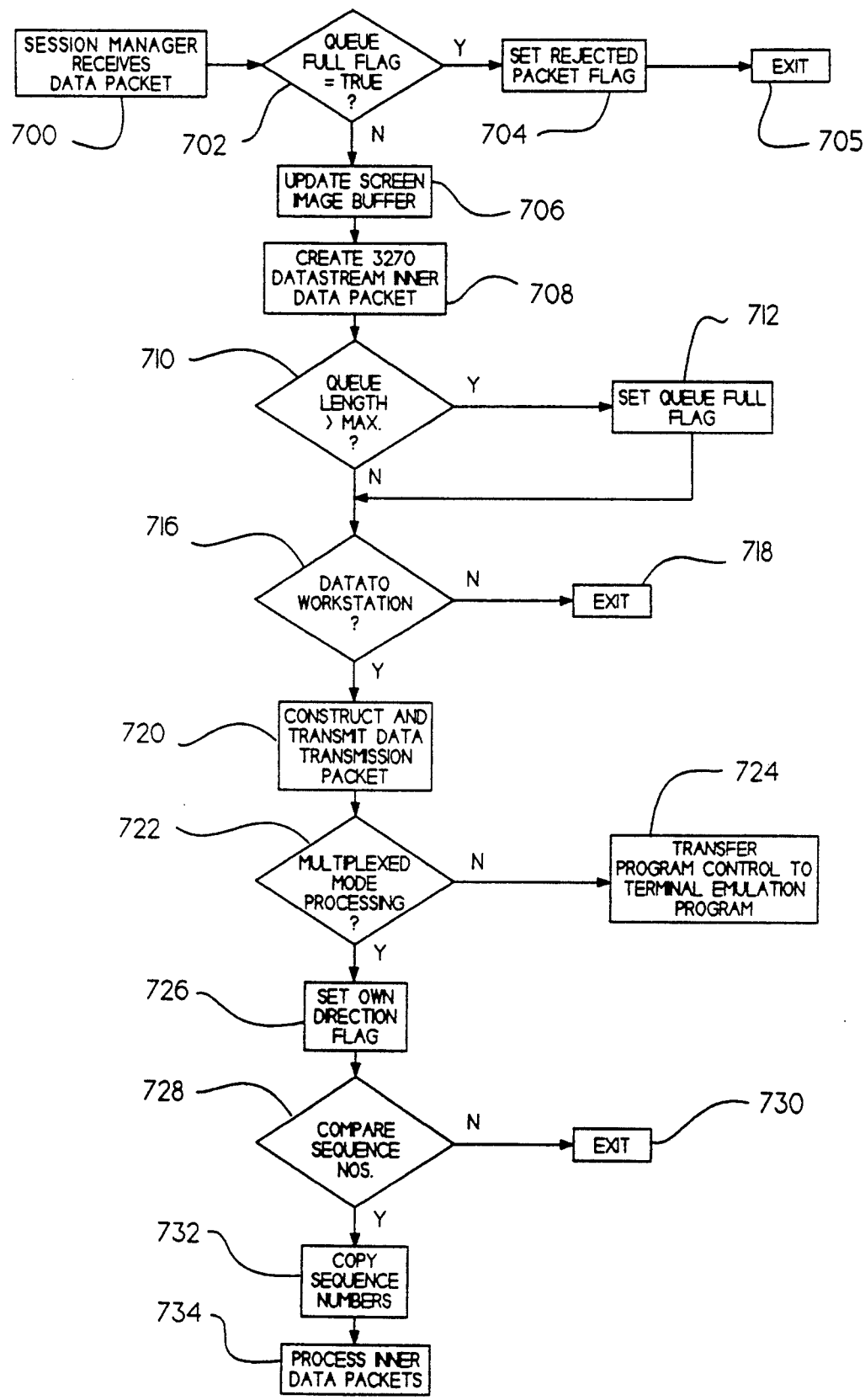

FIG. 20f illustrates the manner by which the multiplexing program 25 of the present invention sends data transmission packets 42 from the host computer module 26 to the user workstation module 28. Program control begins with step 700 where the session manager program 22 receives a data packet from a host application program 24. The host computer module 26 then determines, in step 702, whether the Queue Full Flag 150 of Terminal Session Block 140 (FIG. 14) is true (set to logical 1). If the Queue Full Flag 150 is true (set to logical 1), program control continues with step 704 where the host computer module 26 sets to true (sets to logical 1) the Rejected Packet Flag 168 in the Application Session Block 164 (FIG. 16) associated with the host application program 24 that originally transmitted the data packet to session manager program 22. The host computer module 26 to user workstation module 28 routine is then exited in step 705.

If the host computer module 28 determines in step 702 that the Queue Full Flag 150 in the Terminal Session Block 140 is false (set to logical 0), program control continues with step 706 where the data packet is utilized to update the host application program screen buffer, the memory address of which is stored in item 170 of the Application Session Block 164 (FIG. 16) associated with the host application program 24 originating the data packet. Program control then continues with step 708 where a 3270 Datastream Inner Data Packet 64 (FIG. 13) is built by host computer module 26. The 3270 Datastream Inner Data Packet 64 incorporates the data packet originated by host application program 24. The Spanning Flag 70 in the 3270 Datastream Inner Data Packet 64 is set to hexadecimal 03 to indicate that this is the only segment in the Inner Data Packet 64. The 3270 Datastream Inner Data Packet 64 is then added to an inner data packet output queue (not shown) which is a first-in-first-out queue in the memory area (not shown) of host computer module 26. The memory address of inner data packet output queue is stored in item 162 of Multiplexed Mode Control Block 156 (FIG. 15). Program control continues with step 710, where the host computer module 26 determines whether the length of the inner data packet output queue is greater than a maximum length. If greater than the maximum length, program control continues with step 712 where the Queue Full Flag 150 of Terminal Session Block 140 (FIG. 14) is set to true (set to logical 1).

If the inner data packet output queue is not greater than a maximum length or following step 712, program control continues with step 716 where the host computer module 26 determines whether a data transmission packet 42 may be transmitted to the user workstation module 28. The data transmission packet 42 may be transmitted if either the Own Direction Flag 148 or the Between Brackets Flag 152 in the Terminal Session Block 140 (FIG. 14) is true (set to logical 1). If neither flag is true (set to logical 1), program control continues with step 718 where the host computer module 26 to user workstation module 28 transmission routine is exited. Otherwise, program control continues with step 720 where an output buffer is allocated in the memory space of host computer module 26 and transmission packet 42 is constructed. The Outer Data Packet 60 of the data transmission packet 42 is constructed by copying the Sequence Number 158 in Multiplexed Mode Control Block 156 (FIG. 15) to the Outer Data Packet 60 portion of data transmission packet 42 and then copying the Inner Data Packets 64 stored in the inner data packet output queue to the Inner Data Packet 64 portion of the data transmission packet 42. The copying of inner data packets 64 continues until the output buffer is full. This process is described more fully hereinbelow in the flow chart illustrated in FIG. 20h. The Sequence Number 158 in Multiplexed Mode Control Block 156 is incremented by one. The transmission data packet 42 is then transmitted by the host computer module 26 to the user workstation module 28. The output buffer allocated in step 720 is freed.

Program control then continues with step 722 where user workstation module 28 receives the data transmission packet 42 from host computer module 26. The user workstation module 28 then checks the following conditions: (1) the presence in the data transmission packet 42 of an OEM Data Structured Field Type 58; and (2) whether the Multiplexed Mode Flag 190 in the User Workstation Session Control Block 182 (FIG. 18) is true (set to logical 1). If both conditions are met, program control continues with step 726. If the OEM Data Structured Field Type 58 is present but the Multiplexed Mode Flag 190 is not true (set to logical 0), then the Multiplexed Mode Flag 190 is set to true (set to logical 1) and program control continues with step 726. If neither condition is met, program control continues with step 724. If the OEM Data Structured Field Type 58 is not present but the Multiplexed Mode Flag 190 is set to true (set to logical 1), then the Multiplexed Mode Flag 190 is set to false (set to logical 0), the memory addresses of all User Workstation Virtual Session Control Blocks 204 (FIG. 19) are cleared from the table 202 in User Workstation Session Control Block 182 (FIG. 18), the corresponding User Workstation Virtual Session Control Blocks 204 (FIG. 19) are deleted and program control continues with step 724. In step 724, program control is transferred to terminal emulation program 19 for normal processing of received data transmission packets 42.

In step 726, the user workstation module 28 sets the Between Brackets Flag 196 in User Workstation Session Control Block 182 (FIG. 18) to true (set to logical 1) if an End Bracket Indicator in the Request/Response Header 52 of data transmission packet 42 is set to true (set to logical 1); otherwise, the user workstation module 28 sets the Between Brackets Flag 196 to false (set to logical 0). The user workstation module 28 then sets the Own Direction Flag 192 in User Workstation Session Control Block 182 (FIG. 18) to true (set to logical 1). In step 728, the Sequence Number 194 in User Workstation Session Control Block 182 (FIG. 18) is compared to the Sequence Number 62 in the Outer Data Packet 60 of the received data transmission packet 42. If the two numbers do not match, program control continues with step 730 where the host computer module 26 to user workstation module 28 transmission routine is exited. Otherwise, program control continues with step 732 where the Sequence Number 62 in the Outer Data Packet 60 is copied to the Sequence Number 194 in User Workstation Session Control Block 182 (FIG. 18).

Figure 13:
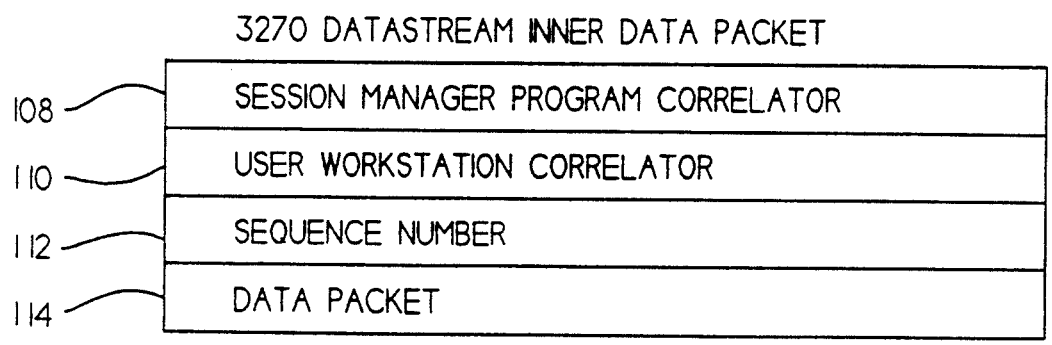
FIG. 13 illustrates the Function Data Field portion of 3270 Datastream Inner Data Packet.

Program control then continues with step 734 where the Inner Data Packets 64 are extracted from the received data transmission packet 42 and are processed by the user workstation module 28. The flow chart in FIG. 20i illustrates the details of the method by which the user workstation module 28 extracts Inner Data Packets 64 from the data transmission packet 42. The Inner Data Packets 64 are processed according to the their particular Function Code 72 (FIG. 7). A 3270 Datastream Inner Data Packet 64 (FIG. 13) is processed by the user workstation module 28 by reconstructing a data transmission packet 42 identical in structure to a PIU in the IBM SNA protocol. The correct destination "virtual" program session is identified by examining the User Workstation Correlator 110 in the 3270 Datastream Inner Data Packet 64 (FIG. 13). The following actions are then performed by the user workstation module 28: (1) the Host Application Logical Unit Number 210 in the User Workstation Virtual Session Control Block 204 (FIG. 19) is placed in the Sender Logical Unit Number in the PIU; (2) the Virtual Terminal Logical Unit Number 208 is placed in the Receiver Logical Unit Number in the PIU; (3) the Sequence Number 112 in the 3270 Datastream Inner Data Packet 64 (FIG. 13) is placed in the PIU Sequence Number; and (4) the Data Packet 114 of the 3270 Datastream Inner Data Packet 64 (FIG. 13) is placed in the data portion of the PIU.

A Null Inner Data Packet 64 is discarded by the user workstation module 28 during processing. A Session List Inner Data Packet 64 (FIG. 9) is processed by the user workstation module 28 by updating the session list block, the address of which is stored in item number 188 of User Workstation Session Control Block 182 (FIG. 18). An Open Window Inner Data Packet 64 (FIG. 11) causes the user workstation module 28 to activate a "virtual" program session (described in the flow chart illustrated in FIG. 20c). A Close Window Inner Data Packet 64 (FIG. 12) causes the user workstation module 28 to inactivate a "virtual" program session (described in the flow chart illustrated in FIG. 20d). An Identify Inner Data Packet 64 (FIG. 8) is processed by the user workstation module 28 by comparing the Host Computer Module Name 76 and Host Computer Module Version Number 78 in Identify Inner Data Packet 64 with those data items stored internally in user workstation module 28. The User Identification Character String 80 in Identify Inner Data Packet 64 is copied to the User Identification Character String 200 in User Workstation Session Control Block 182 (FIG. 18).

Figure 20G:
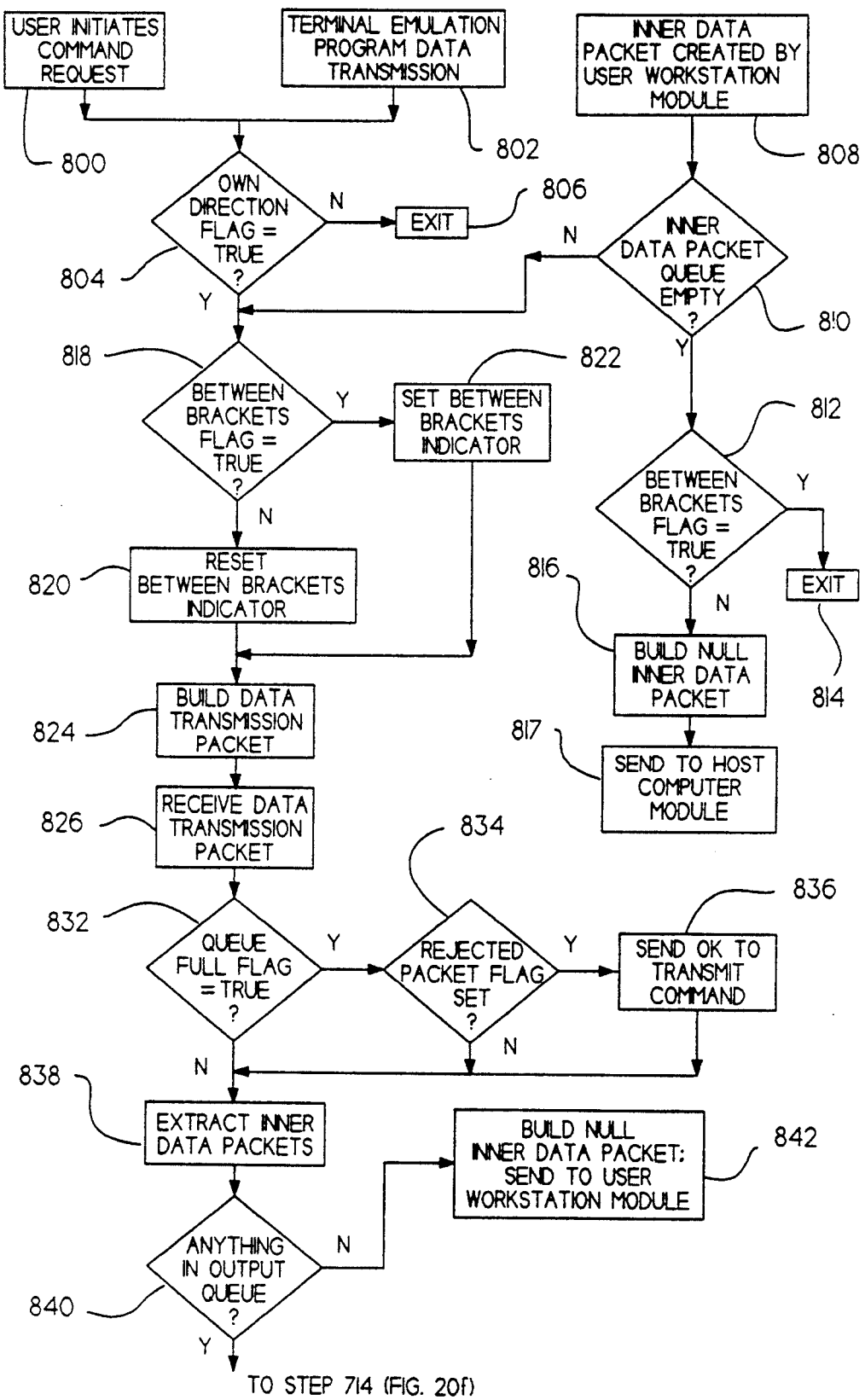

FIG. 20g illustrates the manner by which the multiplexing program 25 of the present invention sends data transmission packets 42 from the user workstation module 28 to the host computer module 26. Program control begins with step 800 where a user initiates a request at user workstation 28 for the session manager program 22 to execute a command. A Session Manager Program Command Inner Data Packet 64 (FIG. 10) is built and placed in the inner data packet output queue, the memory address of which is stored in item 186 in the User Workstation Session Control Block 182 (FIG. 18). The Spanning Flag 70 in the Inner Data Packet 64 is set to hexadecimal 03 signifying that the Inner Data Packet 64 is comprised of only a single segment. In step 802, the terminal emulation program 19 sends a data transmission packet 42 to user workstation module 28. The terminal emulation program 19 only transmits data to a host application program 24 when the corresponding program session 29 on the user workstation 18 owns direction or is between brackets. This is determined from the last Data Packet 114 of the last 3270 Datastream Inner Data Packet 64 received from the host application program 24, the last Data Packet 114 of the last Inner Data Packet 64, or by BIUs (IBM SNA protocol) created by the user workstation module 28 and transmitted to the program session 29. This data transmission packet 42 is identical in structure to a PIU in the IBM SNA protocol. The BIU portion of the PIU is extracted and inserted into a 3270 Datastream Inner Data Packet 64 (FIG. 13) built by user workstation module 28. The user workstation module 28 then performs the following actions: (1) the Session Manager Program Correlator 206 in the User Workstation Virtual Session Control Block 204 (FIG. 19) is copied to the Session Manager Correlator 108 in 3270 Datastream Inner Data Packet 64 (FIG. 13); (2) the User Workstation Correlator 207 in User Workstation Virtual Session Control Block 204 (FIG. 19) is copied to the User Workstation Correlator 110 in 3270 Datastream Inner Data Packet 64; and (3) the 3270 Datastream Inner Data Packet 64 is placed in the inner data packet output queue.

Following either step 800 or step 802, program control continues with step 804 where the user workstation module 28 determines whether it owns direction (as that concept is defined in the IBM SNA protocol) by determining whether the Own Direction Flag 192 in the User Workstation Session Control Block 182 (FIG. 18) is true (set to logical 1). If the Own Direction Flag 192 is false (set to logical 0), program control continues with step 806 where the user workstation module 28 to host computer module 26 transmission routine is exited. Otherwise, program control continues with step 818.

Step 808 illustrates the scenario where an Inner Data Packet 64 is created by user workstation module 28 because of a previous data transmission packet 42 received from the host computer module 26. Such Inner Data Packets 64 are added to the inner data packet output queue, the address of which is located in item 186 of the User Workstation Session Control Block 182 (FIG. 18). After execution of step 808, program control continues with step 810 where the user workstation module 28 determines whether the inner data packet output queue is empty. If the inner data packet output queue is empty, program control continues with step 812 where the user workstation module 28 determines whether the Between Brackets Flag 196 in User Workstation Session Control Block 182 (FIG. 18) is true (set to logical 1). If the Between Brackets Flag 196 is true, there is no need to send a Null Inner Data Packet 64 to the host computer module 26 to change direction (according to the IBM SNA protocol) and, as such, program control continues with step 814 where the user workstation module 28 to host computer module 26 transmission routine is exited. If the Between Brackets Flag 196 is false, program control continues with step 816 where the user workstation module 28 builds a Null Inner Data Packet 64 and places it in the inner data packet output queue. Program control continues with step 817 where the Null Inner Data Packet 64 is transmitted to host computer module 26 in the manner explained in step 824 below.

If the user workstation module 28 made the determination in step 804 that the Own Direction Flag 192 was true (set to logical 1) or the determination in step 810 that the inner data packet output queue was not empty, program control continues with step 818 where the user workstation module 28 determines whether the Between Brackets Flag 196 in User Workstation Session Control Block 182 (FIG. 18) is true (set to logical 1). If the Between Brackets Flag 196 is false, program control continues with step 820 where the user workstation module 28 builds a data transmission packet 42 in the output buffer, the memory address of which is stored in item number 184 of the User Workstation Session Control Block 182 (FIG. 18), and the Between Bracket Indicator of the Request/Response Header 52 of data transmission packet 42 is set to false (set to logical 0). If the Between Brackets Flag 196 is true, the identical action described in step 820 is performed except that the Between Bracket Indicator of the Request/Response Header 52 is set to true (set to logical 1).

Figure 20H:
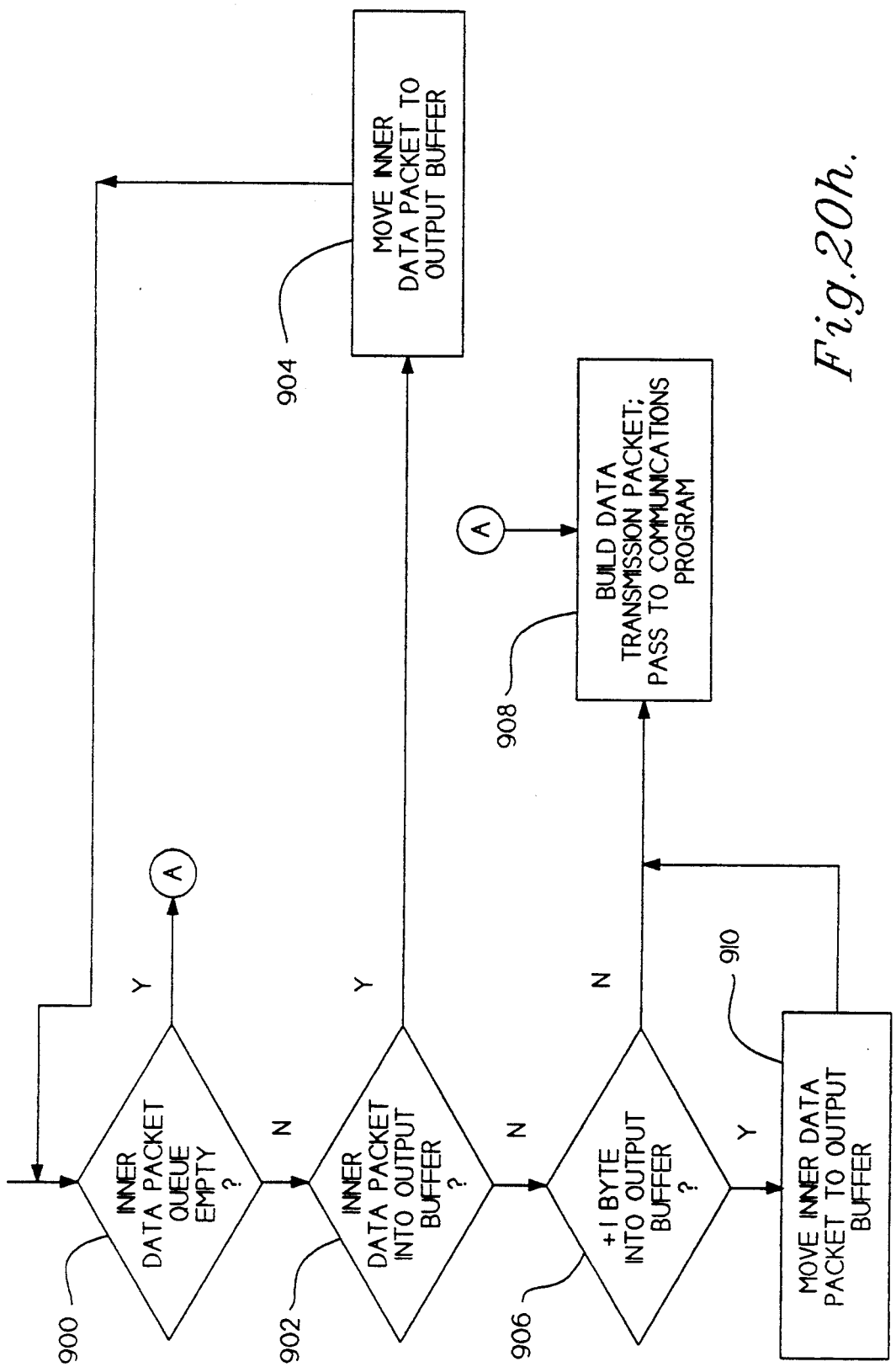
Figure 20I:
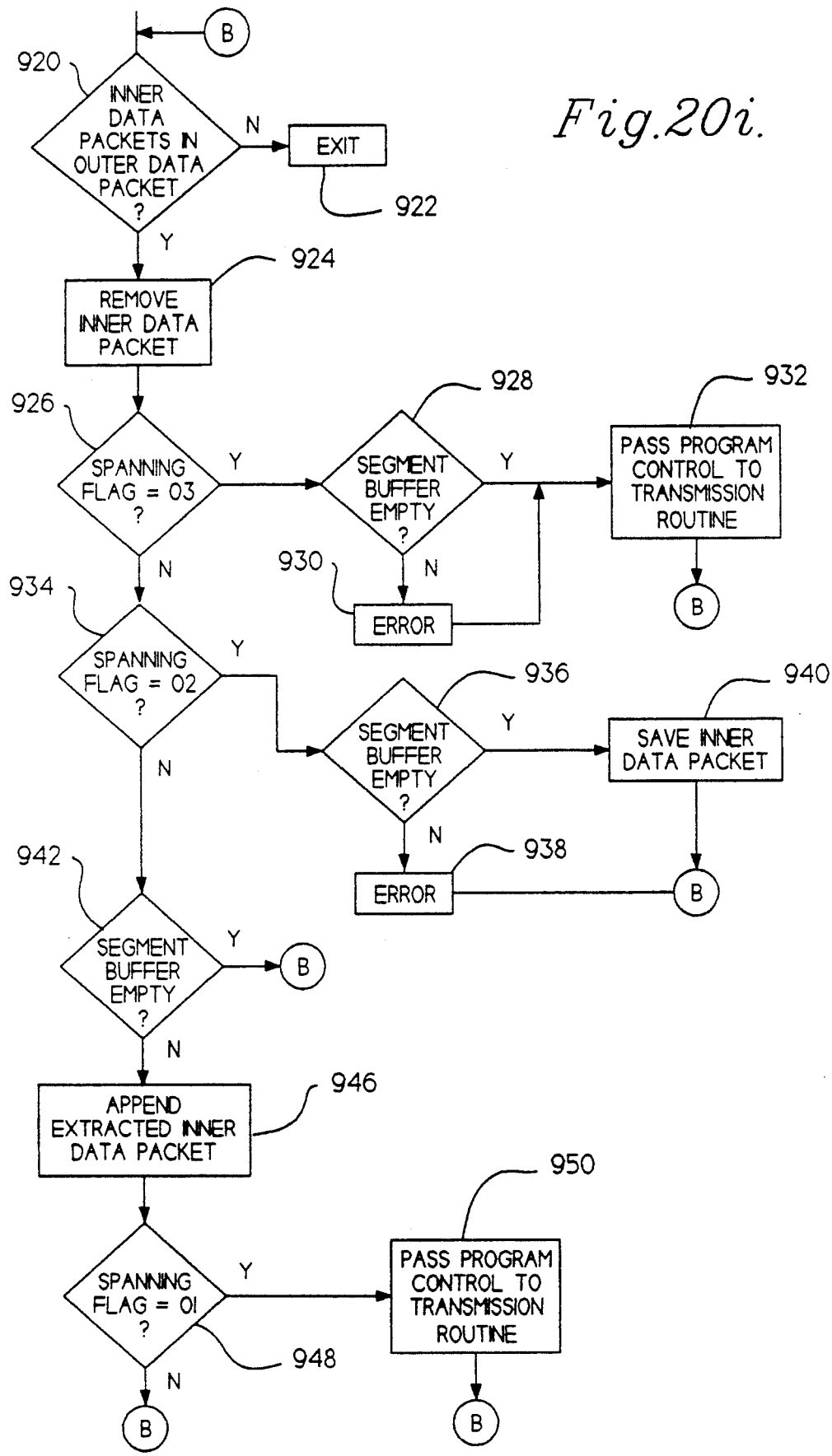

Following either step 820 or step 822, program control continues with step 824 where the Inner Data Packets 64 in the inner data packet output queue are copied to the output buffer. The flow chart illustrated in FIG. 20h illustrates the method by which user workstation module 28 performs this function. The user workstation module 28 then copies the Sequence Number 194 from the User Workstation Session Control Block 182 (FIG. 18) to the Sequence Number 62 of Outer Data Packet 60 of data transmission packet 42. User workstation module 28 then transmits the data transmission packet 42 to host computer module 26 and then sets to false (set to logical 0) the Own Direction Flag 192 in the User Workstation Session Control Block 182 (FIG. 18).

In step 826, the host computer module 26 receives the data transmission packet 42. Program control continues with step 832 where the host computer module determines whether the Queue Full Flag 150 in Terminal Session Block 140 (FIG. 14) is true (set to logical 1). If the Queue Full Flag 150 is true, then the Rejected Packet Flag 168 in each Application Session Block 164 (FIG. 16) is tested in step 834. If the Rejected Packet Flag 168 is true (set to logical 1) in any Application Session Block 164, the following functions are performed by the host computer module 26 in step 836: (1) an LUSTAT RU (IBM SNA protocol) is transmitted by the host computer module 26 to the host application program 24 associated with the Application Session Block 164 wherein the Rejected Packet Flag 168 is true (the LUSTAT RU command indicates to the host application program 24 that it may now transmit data); (2) the Rejected Packet Flag 168 is set to false (set to logical 0); and (3) the Queue Full Flag 150 in the Terminal Session Block 142 (FIG. 14) is set to false (set to logical 0).

If the tested condition is not satisfied in either step 832 or step 834, or following step 836, program control continues with step 838 where the Own Direction Flag 148 of Terminal Session Block 140 (FIG. 14) is set to true (set to logical 1) and where Inner Data Packets 64 are extracted from the data transmission packet 42 as is explained by the flow chart illustrated in FIG. 20i. The Inner Data Packets 64 are then processed by host computer module 26. Null Inner Data Packets 64 are discarded. An Open Window Inner Data Packet 64 (FIG. 11) is processed by the host computer module 26 by saving the User Workstation Correlator 94 located in Open Window Inner Data Packet 64 in the User Workstation Correlator 178 in Virtual Session Control Block 176 (FIG. 17). Further processing continues as illustrated in the flow chart of FIG. 20c. A Close Window Inner Data Packet 64 (FIG. 12) is processed according to the steps outlined in the flow chart illustrated in FIG. 20d. The host computer module 26 processes a 3270 Datastream Inner Data Packet 64 (FIG. 13) by reconstructing a data transmission packet 42 identical in structure to a Request Unit (IBM SNA protocol). The correct destination "virtual" program session is identified by examining the Session Manager Program Correlator 108 in the 3270 Datastream Inner Data Packet 64 (FIG. 13). The resulting Request Unit is then passed to the session manager program 22. A Session Manager Program Command Inner Data Packet 64 (FIG. 10) is processed by extracting the Session Manager Program Command String 90 from the Inner Data Packet 64 and passing the command string to the session manager program 22.

Following step 838, program control continues with step 840 where the host computer module 26 determines whether there are any inner data packets 64 in the inner data packet output queue. If not, program control continues with step 842 where a Null Inner Data Packet 64 is built by the host computer module 26 and is sent to the user workstation module 28; the End Bracket Indicator (IBM SNA protocol) of the BIU (IBM SNA protocol) in data transmission packet 42 is set to true (set to logical 1); the Between Brackets Flag 152 and Own Direction Flag 148 of Terminal Session Block 140 (FIG. 14) are set to true (set to logical 1). Otherwise, program control continues with step 714.

FIG. 20h illustrates the process by which the multiplexing program 25 of the present invention encodes Inner Data Packets 64 into Outer Data Packets 60. This process is performed identically by both the host computer module 26 and the user workstation module 28 so that the following discussion relates to both modules. The host computer module 26 and the user workstation module 28 will, therefore, be referred to generically in the following discussion as "the multiplexing program 25". Program control begins with step 900 where the multiplexing program 25 determines whether the inner data packet output queue is empty. On the host computer 12, this is determined by examining the inner data packet output queue whose memory address is stored in item 162 of Multiplexed Mode Control Block 156 (FIG. 15). On the user workstation 18, this determination is made by examining the inner data packet output queue whose address is stored in item 186 of User Workstation Session Control Block 182 (FIG. 18). If the inner data packet output queue is empty, program control continues with step 908 described below; otherwise, program control continues with step 902.

In step 902, multiplexing program 25 determines whether the first Inner Data Packet 64 in the inner data packet output queue will fit into the output buffer on either the host computer 12 or the user workstation 18. The output buffer on the host computer 12 is obtained dynamically while the memory address of the output buffer on the user workstation 18 is stored in item 184 of User Workstation Session Control Block 182 (FIG. 18). If sufficient space is available in the output buffer, program control continues with step 904 where the first Inner Data Packet 64 in the inner data packet output queue is moved to the beginning of the output buffer. The multiplexing program 25 then examines the Spanning Flag 70 in the Inner Data Packet 64 moved to the output buffer. Unless the Spanning Flag 70 is set to hexadecimal 03, indicating that the Inner Data Packet 64 is the only segment in the series of segments, the Spanning Flag 70 is set to hexadecimal 01 indicating that the Inner Data Packet 64 is the last segment in the series of segments. Program control then returns to step 900.

If the multiplexing program 25 determines, in step 902, that the first Inner Data Packet 64 in the inner data packet output queue will not fit into the output buffer, program control continues with step 906 where the multiplexing program 25 determines whether the remaining space in the output buffer is sufficient to hold the following components of Inner Data Packet 64: Length Field 66, Structured Field Command 68, Spanning Flag 70, Function Code 72 and at least one byte of the Function Data Field 74. If not, program control continues with step 908 where the required header fields for the Outer Data Packet 60 and data transmission packet 42 are constructed. The resulting data transmission packet 42 is then passed to the communications program (not shown) in either host computer 12 or user workstation 18 for transmission.

If the multiplexing program 25 determines, in step 906, that sufficient space is available in the output buffer, program control continues with step 910 where the portion of the Inner Data Packet 64 for which space is available is moved into the output buffer. The multiplexing program 25 then performs the following processing functions on the Inner Data Packet 64 moved into the output buffer: (1) modify the Length Field 66 so that it correctly indicates the length of the portion of the Inner Data Packet 64 moved into the output buffer; (2) modify the Spanning Flag 70 to hexadecimal 02 (first but not last segment) if it is presently set to hexadecimal 03 (only segment), otherwise, set Spanning Flag 70 to hexadecimal 00 (neither first nor last segment). The multiplexing program 25 then creates a new Inner Data Packet 64 from the portion of the Inner Data Packet 64 not moved to the output buffer by performing the following actions: (1) copy the Length Field 66, Structured Field Command 68, Spanning Flag 70 and Function Code 72 from the Inner Data Packet 64 moved to the output buffer; (2) insert the portion of the Inner Data Packet 64 not moved to the output buffer to the Function Data Field 74 of the newly created Inner Data Packet 64; (3) modify the Length Field 66 to reflect the length of the newly created Inner Data Packet 64; and (4) modify the Spanning Flag 70 of the newly created Inner Data Packet 64 to hexadecimal 00 (neither first nor last segment). Program control then continues with step 908.

FIG. 20i illustrates the process by which the multiplexing program 25 of the present invention extracts Inner Data Packets 64 from Outer Data Packets 60. Again, this process is performed identically by both the host computer module 26 and the user workstation module 28 so that the following discussion relates to both modules. The host computer module 26 and the user workstation module 28 will, therefore, continue to be referred to generically in the following discussion as the multiplexing program 25. Program control begins with step 920 where the multiplexing program 25 determines whether there are any additional Inner Data Packets 64 in the Outer Data Packet 60 currently being processed. If no Inner Data Packets 64 remain, program control continues with step 922 where the multiplexing program 25 exits the routine which extracts Inner Data Packets 64. If however, Inner Data Packets 64 remain in the Outer Data Packet 60, program control continues with step 924 where the next Inner Data Packet 64 in the Outer Data Packet 60 is removed therefrom. Program control continues with step 926 where the Spanning Flag 70 in the extracted Inner Data Packet 64 is examined to determine whether it is set to hexadecimal 03 (only segment).

If the Spanning Flag 70 contains an "only segment" designation, program control continues with step 928. Step 928 is performed differently by the host computer module 26 and user workstation module 28 of multiplexing program 25. The user workstation module 28 determines whether the buffer for individual segments of Inner Data Packets 64 is empty. The memory address of this buffer in the user workstation 18 is stored in item 198 of the User Workstation Session Control Block 182 (FIG. 18). If this buffer is not empty, an error condition has occurred and program control continues with step 930 where the contents of this buffer are discarded. If this buffer is empty, or, following step 930, program control continues with step 932 where program control is transferred to the flow chart of FIG. 20g. Host computer module 26 performs no functions in steps 928 or 930 and, in step 932, passes program control to the flow chart of FIG. 20f. Following return of program control to the flow chart of FIG. 20i, program control returns to step 920.

If the multiplexing program 25 determines, in step 926, that the Spanning Flag 70 in the Inner Data Packet 64 being processed does not contain an "only segment" designation, program control continues with step 934 where the multiplexing program 25 determines whether the Spanning Flag 70 contains a hexadecimal 02 (first but not last segment). If the condition is true, program control continues with step 936 where the multiplexing program 25 determines whether the buffer for individual segments of Inner Data Packets 64 described above is empty. If the condition is not true, an error condition has occurred and program control continues with step 938 where the contents of this buffer are discarded; program control is then returned to step 920. If the condition is true, program control continues with step 940 where the extracted Inner Data Packet 64 is saved in the buffer for partially received Inner Data Packets 64; program control then continues with step 920. Again, host computer module 26 would perform no functions in steps 936 or 938 and, in step 940, would save the extracted Inner Data Packet 64 in the inner data packet output queue on host computer 12.

If the multiplexing program 25 determines in step 934 that the Spanning Flag 70 did not contain a "first but not last segment" designation, program control continues with step 942 where the buffer for individual segments of Inner Data Packets 64 is examined to determine whether it is empty. If the condition is true, an error condition has occurred; program control then continues with step 920. If the condition is not true, program control continues with step 946 where the following actions are performed by multiplexing program 25: (1) the Function Data Field 74 of the extracted Inner Data Packet 64 is appended to the buffer for individual segments of Inner Data Packets 64; (2) the Spanning Flag 70 of the Inner Data Packet 64 being constructed in this buffer is set to hexadecimal 00 (neither first nor last segment); and (3) the Length Field 66 of the Inner Data Packet 64 being constructed in this buffer is adjusted by adding the length of the Function Data Field 74 of extracted Inner Data Packet 64. Host computer module 26 performs no functions in steps 942 and 946. Program control then continues with step 948 where the Spanning Flag 70 of the extracted Inner Data Packet 64 is examined to determine whether it contains a "last segment" designation. If the condition is true, program control continues with step 950 where program control is then transferred to either the flow chart of FIG. 20f, in the case of host computer module 26 processing, or the flow chart of FIG. 20g, in the case of user workstation 18 processing; following return of program control to the flow chart of FIG. 20i, program control returns to step 920. If the condition in step 948 is not true, program control continues with step 920.

While the present invention has been described in connection with an exemplary embodiment thereof, it will be understood that many modifications and variations will be readily apparent to those of ordinary skill in the art. This disclosure and the following claims are intended to cover all such modifications and variations.

We claim:

1. A system for multiplexing data transmissions exchanged between a host computer system and a user workstation wherein the host computer system and the user workstation are connected by a communications link and wherein one or more host application programs reside upon and are executed by the host computer system, while a terminal emulation program having the capability of simultaneously displaying one or more host application program screens resides upon and is executed by the user workstation, said system for multiplexing data transmissions comprising:

a session manager program residing upon and executed by the host computer system for establishing one or more program sessions with the host application programs, each of said program sessions generating its own individual datastreams, and for establishing a single program session with the terminal emulation program utilizing a single connection between the host computer system and the user workstation, and wherein the terminal emulation program simultaneously displays the host application program screen for each of said program sessions established between said session manager program and the host application programs;

first means residing in the host computer system and in the user workstation for intercepting said individual datastreams before said individual datastreams are transmitted to the user workstation or to the host computer system;

second means residing in the host computer system and in the user workstation for building inner data packets from said individual datastreams generated by each of said program sessions;

third means residing in the host computer system and in the user workstation for inserting said inner data packets into a data transmission packet for transmission between the host computer system and the user workstation over said single connection;

fourth means residing in the host computer system and in the user workstation for intercepting said data transmission packet received by the host computer system and the user workstation before said data transmission packet is processed by either said session manager program or the terminal emulation program, respectively; and fifth means residing in the host computer system and in the user workstation for removing said inner data packets from said data transmission packet and for recreating said individual datastreams therefrom.

2. The multiplexing system of claim 1 wherein said data transmission packet includes appropriate protocol commands compatible with the host computer system and the user workstation to permit free-form formatting of data in said data transmission packet.

3. The multiplexing system of claim 2 wherein said inner data packets are stored in a queue on the host computer system and a queue on the user workstation until said inner data packets are inserted into said data transmission packet.

4. The multiplexing system of claim 3 wherein said data transmission packet further includes control commands stored in said inner data packets.

5. The multiplexing system of claim 4 wherein said inner data packet includes a spanning flag to permit the segmentation of said inner data packets between more than one of said data transmission packets.

6. The multiplexing system of claim 5 wherein said inner data packets further include a function code and a function data field and wherein said function code indicates whether said function data field includes one of said individual datastreams or one of said control commands.

7. The multiplexing system of claim 1 further including means for controlling the flow of said individual datastreams transmitted between the host application programs and the terminal emulation program through said session manager program over said single connection independently of the flow of said data transmission packet between the host computer system and the user workstation over said single connection.

8. A method for multiplexing data transmissions exchanged between a host computer system and a user workstation wherein the host computer system and the user workstation are connected by a communications link and wherein one or more host application programs reside upon and are executed by the host computer system while a terminal emulation program having the capability of simultaneously displaying one or more host application program screens resides upon and is executed by the user workstation, said method comprising the steps of:

establishing one or more program sessions with the host application programs, each of said program sessions generating its own individual datastreams;

establishing a single program session with the terminal emulation program utilizing a single connection between the host computer system and the user workstation, wherein the terminal emulation program simultaneously displays the host application program screen for each of said program sessions established with the host application programs;

intercepting said individual datastreams before said individual datastreams are transmitted to the user workstation or to the host computer system;

building inner data packets from said individual datastreams generated by each of said program sessions;

inserting said inner data packets into a data transmission packet for transmission between the host computer system and the user workstation over said single connection;

intercepting said data transmission packet received by the host computer system and the user workstation before said data transmission packet is processed by either the host application programs or the terminal emulation program, respectively; and removing said inner data packets from said data transmission packet and for recreating said individual datastreams therefrom.

9. The multiplexing method of claim 8 additionally comprising the step of storing said inner data packets in a queue on the host computer system and in a queue on the user workstation until said step of inserting said inner data packets into said data transmission packet is performed.

10. The multiplexing method of claim 9 additionally comprising the step of controlling the flow of said individual datastreams transmitted between the host application programs and the terminal emulation program over said single connection independently of the flow of said data transmission packet between the host computer system and the user workstation over said single logical connection.

* * * * *

UNITED STATES PATENT AND TRADEMARK OFFICE
CERTIFICATE OF CORRECTION

PATENT NO. : 5,325,361
DATED : June 28, 1994
INVENTOR(S) : Jeffrey H. Lederer, David J. Connell, Patrick V. Pagano It is certified that error appears in the above-indentified patent and that said Letters Patent is hereby corrected as shown below:

Col. 5, line 14, delete "directs" and substitute therefor --direct--.

Signed and Sealed this

Twentieth Day of December, 1994

Attest:

BRUCE LEHMAN

Attesting Officer        Commissioner of Patents and Trademarks